(12) United States Patent
Zhang

(10) Patent No.: US 6,810,259 B1
(45) Date of Patent: Oct. 26, 2004

(54) LOCATION UPDATE PROTOCOL

(75) Inventor: Greg Zhang, San Jose, CA (US)

(73) Assignee: Utstarcom Inc., Alameda, CA (US)

( * ) Notice: Subject to any disclaimer, the term of this patent is extended or adjusted under 35 U.S.C. 154(b) by 495 days.

(21) Appl. No.: 09/738,203

(22) Filed: Dec. 14, 2000

Related U.S. Application Data

(60) Provisional application No. 60/172,302, filed on Dec. 16, 1999, and provisional application No. 60/210,334, filed on Jun. 7, 2000.

(51) Int. Cl.[7] .................................................. H04M 1/00
(52) U.S. Cl. ............................... 455/456.5; 455/456.1; 455/435.1; 455/436; 711/130; 711/141; 711/119
(58) Field of Search .......................... 455/456.1, 456.5, 455/435.1, 436, 440, 448, 433, 432.3, 411, 410, 412.1; 711/130, 141, 119; 709/213; 345/811

(56) References Cited

U.S. PATENT DOCUMENTS

| | | | |
|---|---|---|---|
| 5,265,092 A | * 11/1993 | Soloway et al. | ............. 370/238 |
| 5,742,820 A | * 4/1998 | Perlman et al. | ............. 707/201 |
| 5,793,362 A | 8/1998 | Matthews et al. | |
| 5,831,975 A | 11/1998 | Chen et al. | |
| 5,930,472 A | * 7/1999 | Smith | ......................... 709/203 |
| 6,092,155 A | * 7/2000 | Olnowich | ................... 711/142 |
| 6,262,984 B1 | 7/2001 | Rochberger | |
| 6,301,483 B1 | * 10/2001 | Israelsson | ................... 455/462 |
| 6,331,984 B1 | * 12/2001 | Luciani | ....................... 370/401 |
| 6,532,493 B1 | 3/2003 | Aviani et al. | |
| 6,611,525 B1 | * 8/2003 | Natanson et al. | ...... 370/395.53 |

* cited by examiner

Primary Examiner—Charles Appiah
Assistant Examiner—Khawar Iqbal
(74) Attorney, Agent, or Firm—Claude Hamrick; Felix L. Fischer

(57) ABSTRACT

A location update protocol is provided for use in a mobile communications network having a distributed cache for managing subscriber profile information associated with each of a plurality of subscribers of the network. The network includes a plurality of base stations each including a memory unit having a local database for storing: a local subscriber list including a plurality of locally owned cache entries each having an associated subscriber key value, and an associated locally owned subscriber profile; and a global subscriber list including a plurality of global cache entries each having an associated subscriber key value, and an associated location value indicating a node in the network at which an associated subscriber profile is stored. Each of the base stations is operative to transfer and copy selected ones of the cache entries to other ones of the base stations for the purposes of managing and accessing the distributed cache. Each of the base stations is further operative to access an associated mirror base station list indicating at least one associated mirror one of the base stations. The local database of each of the base stations further provides for storage of a mirror subscriber profile list including a plurality of mirror cache entries each having an associated subscriber key value, and an associated mirror subscriber profile. Each of the base stations transfers mirror copies of the associated locally owned cache entries to each of the associated mirror base stations in accordance with the protocol.

33 Claims, 27 Drawing Sheets

INFORMATION MAINTAINED FOR EACH LOGICAL NODE

260

PEER GROUP HELLO PARAMETER INFORMATION

| PEER GROUP MEMBER | TIME STAMP VALUE (INDICATING TIME OF ARRIVAL OF LAST PEER GROUP HELLO MESSAGE) | SEQUENCE NO. |
|---|---|---|
| | | |
| | | |
| | | |

NEIGHBOR LIST

| NODE | HOP NUMBER (TTL RADIUS) |
|---|---|
| NODE_ID_1 | |
| | |
| | |
| NODE_ID_M | |

NODAL HIERARCHY LIST (FOR PHYSICAL NODE)

| PEER_GROUP_ID |
|---|
| PEER_GROUP_ID |
| PEER_GROUP_ID |
| PEER_GROUP_ID |
| PEER_GROUP_ID |

FIG. 6F

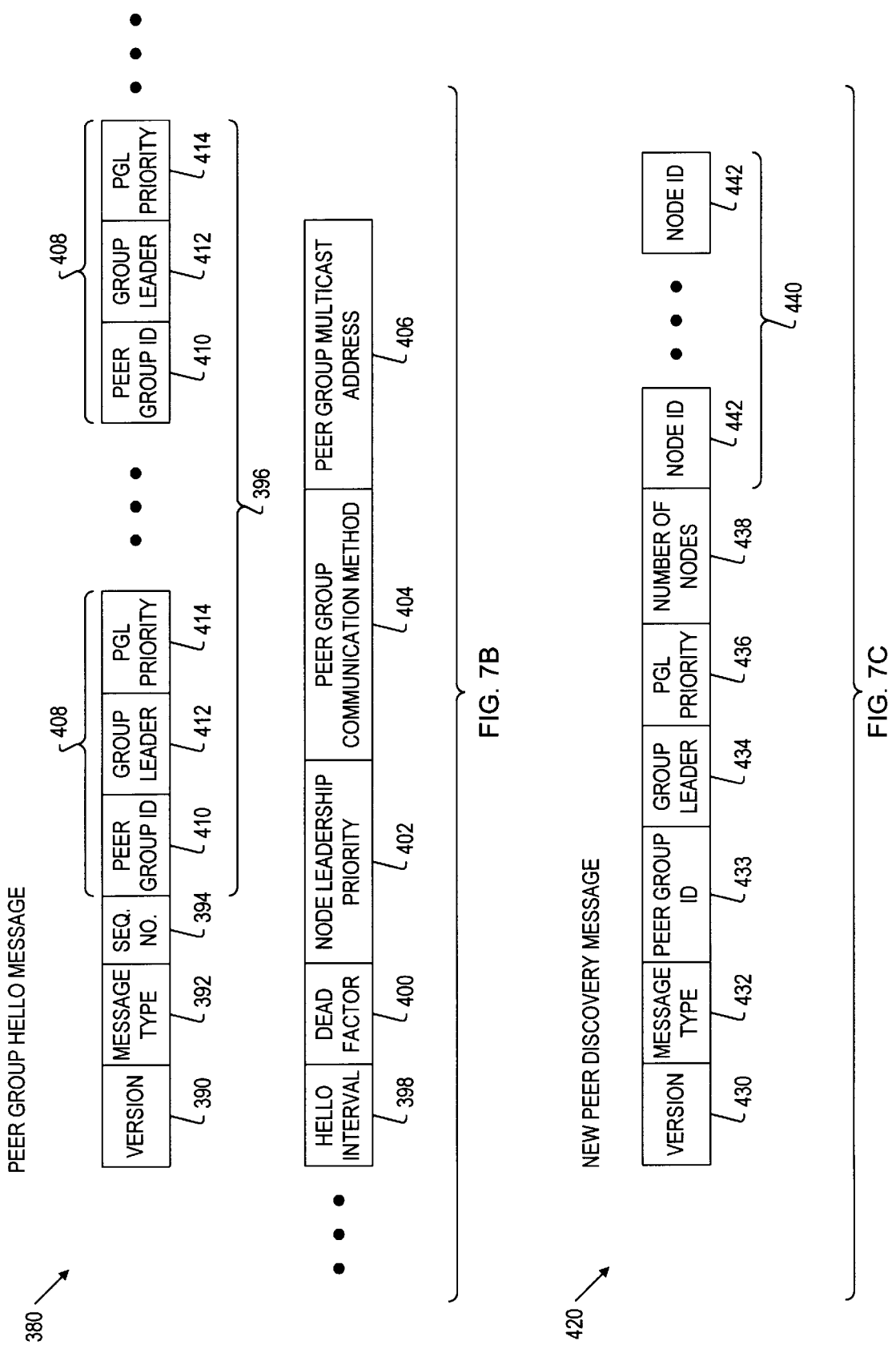

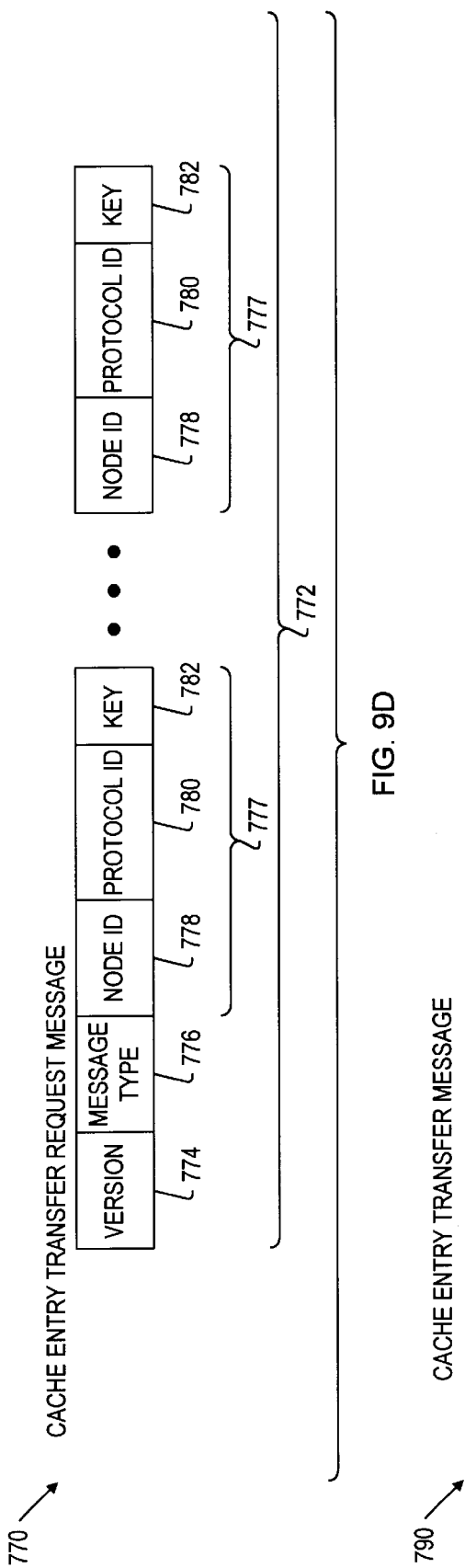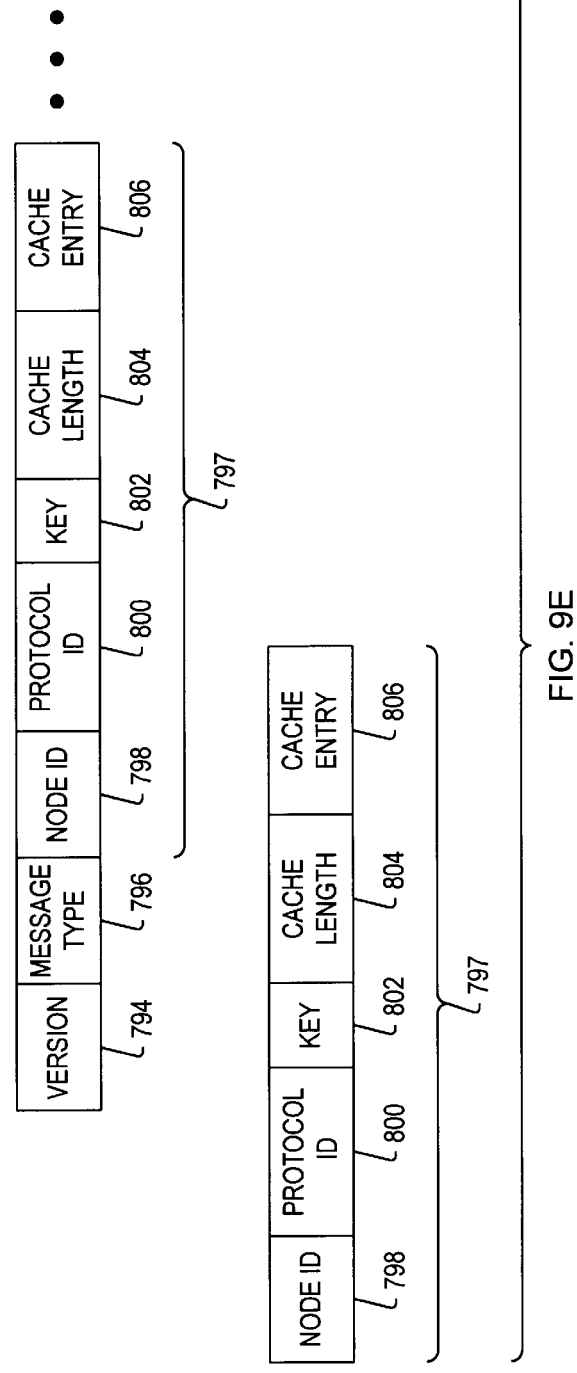

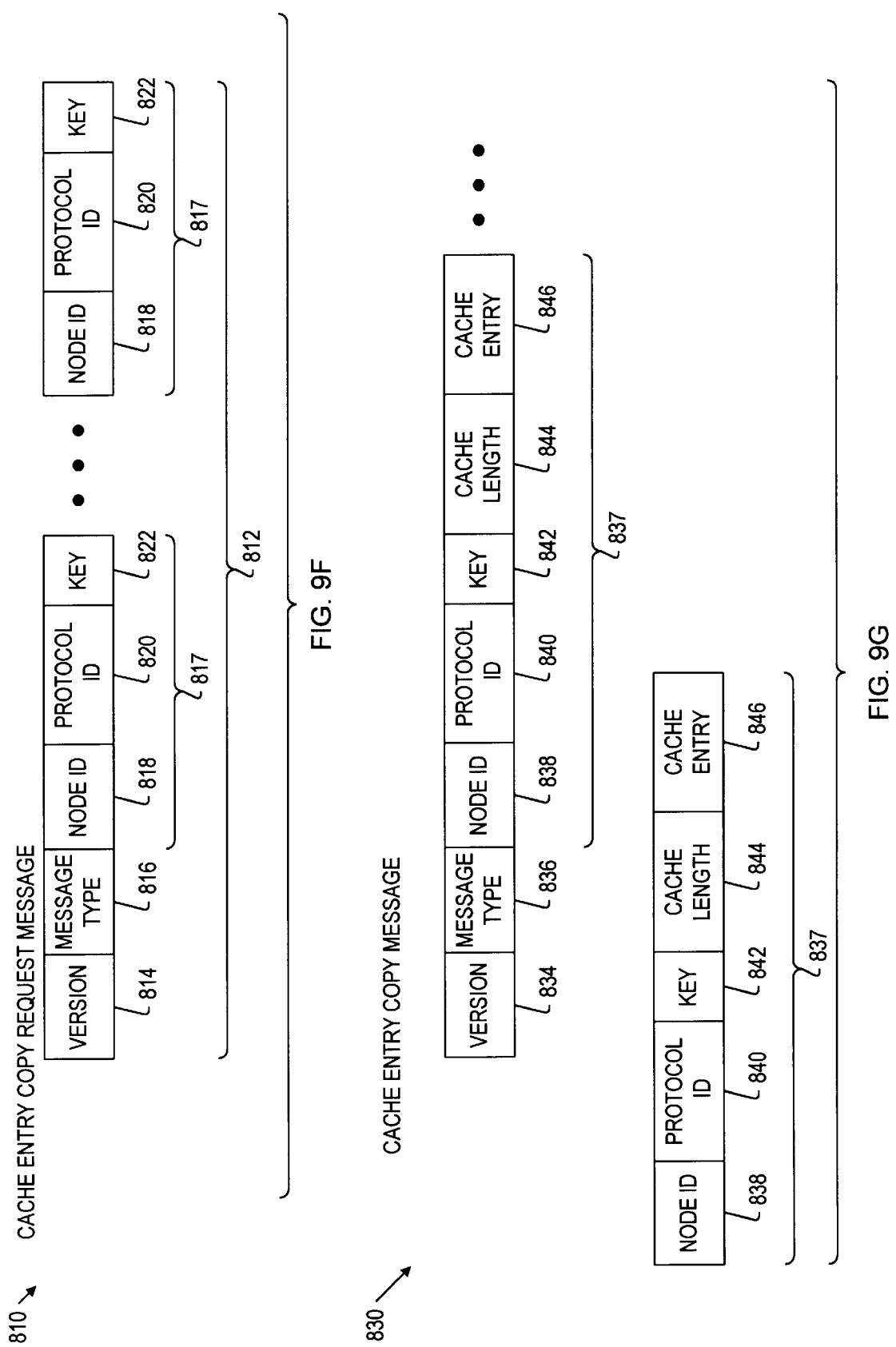

LOCATION UPDATE PROTOCOL

CROSS REFERENCE TO RELATED APPLICATIONS

Reference is made and priority claimed to U.S. provisional patent application No. 60/172,302, filed on Dec. 16, 1999, and U.S. provisional patent application No. 60/210, 334, filed on Jun. 7, 2000.

BACKGROUND OF THE INVENTION

1. Field of the Invention

The present invention relates generally to mobile communications networks, and more specifically to a location update protocol for use in managing subscriber profile information associated with each of a plurality of mobile hosts of the network as the hosts move from one location in the network to another in a mobile communications network.

2. Description of the Prior Art

FIG. 1 shows a generalized block diagram of a conventional wireless mobile communications network at 10, the network 10 being operated in accordance with a prior art fully centralized cache management system for managing subscriber profile information associated with each of a plurality of subscribers of the network. The network 10 includes a central database system 14 (also commonly referred to as a network operating center, or an operations support system (OSS)) having a central server computer system 16, and a central database 18 communicatively coupled with the central server 16. The central database 18 provides a centralized cache for storing subscriber profiles associated with each of the subscribers, each profile including all information necessary for executing call-processing operations associated with the subscriber. The central database also provides for storing location register information associated with subscribers of the network, the location register information typically including a home location register database (HLR database) for storing location information associated with local registered subscribers of the network, and a visitor's location register database (VLR database) for storing location information associated with roaming users of the network. When location information associated with a particular subscriber is required (e.g., for executing call processing functions), the central database system 14 is called upon to perform lookup functions in order to determine a profile and a current location of the subscriber in the network, the central database system then provides the location information along with the profile associated with the particular subscriber as further explained below. Typically, the central database system 14 is supported by a back office system that includes a subscriber management system, a billing system, and a network management system (not shown). Wireless communications networks, such as the network 10, typically operate in accordance with one of the wireless cellular communications standards such as GSM, CDMA, etc.

The wireless mobile network 10 further includes a plurality of base stations 24 communicatively coupled with each other, with the central database system 14, and with the transaction servers 20 via the backbone 22 of the network. Typically, each of the base stations 24 is communicatively coupled with a radio port (not shown) having an antenna 26, and is operative to communicate via wireless links with each of a plurality of mobile hosts 30 located within a coverage area 28 associated with the base station. Each of the mobile hosts 30 may be a cellular telephone handset, a personal digital assistant (PDA), or a lap top computer having wireless communication capabilities. As examples, a first one of the base stations 24 designated BASE_STATION_1 is associated with a first coverage area designated AREA_1, and a second one of the base stations designated BASE_STATION_2 is associated with a second coverage area designated AREA_2.

FIG. 2 shows a table diagram illustrating a global subscriber list at 40 including subscriber profile information associated with each subscriber of the network 10, the global subscriber list 40 being stored in the centralized database 18 (FIG. 1) of the central database system 14, and being managed in accordance with the prior art fully centralized data management system. The global subscriber list 40 includes a plurality of subscriber profile cache entries 42 each being associated with one of the subscribers of the network 10 (FIG. 1), and having: a subscriber key field 44 for storing a subscriber key value associated with one of the subscribers of the network; a base station location field 46 for storing a node identification value indicating an associated owner one of the base stations 24 (FIG. 1) which currently "owns" the associated subscriber profile as further explained below; and a profile information field 50 for storing the actual profile data associated with the subscriber.

Referring back to FIG. 1, when a subscriber initially activates one of the mobile hosts 30 within one of the coverage areas 28, a registration procedure is performed for "signing on" to the network. In accordance with the registration procedure, the host 30 transmits an associated link layer identifier (ID) to the local base station. The link layer ID typically includes a manufacturer identification value, which uniquely identifies the subscriber's host device. When the base station receives the link layer ID, the base station must initially query the central database system 14 by sending a registration message to the central database system via one of the transaction servers 20 requesting access to a subscriber profile associated with the host. Typically, the network addresses of the transaction servers 20 are configured into the base stations 24. The registration message carries the link layer ID of the host, and the current location of the host which is indicated by the node ID value of the owner base station. The central server 14 is responsive to the registration message, and is operative to retrieve a subscriber profile matching the link layer ID from the central database 18, and is also operative to update the location field 46 (FIG. 2) of the corresponding subscriber profile cache entry to indicate the current location of the associated host in the event that the location has changed since a last transaction. So, the location of each subscriber is assumed to be the particular base station, which detected the sign-on, and the current owner of the profile is that particular base station.

In order to be able to correctly process calls to and from each of the mobile hosts 30 in the mobile communications network 10, a mechanism is provided to keep track of the location of subscribers. The location field 46 (FIG. 2) of each subscriber profile must be updated as the mobile hosts move within the network. As one of the hosts 30 moves from one of the coverage areas 28 to another, a handoff procedure is performed to transfer ownership of the associated subscriber profile (as well as control of communication between the host and other nodes of the network) from an old one of the base stations 24 to a new one of the base stations 24. Each of the base stations is operative to generate location update messages upon each hand-off that occurs, and is operative to provide the location update messages to the central server 16 for updating associated subscriber profiles. Each of the location update messages indicates a transfer of ownership of an associated one of the subscriber profiles.

In accordance with call processing operations in a fully centralized cache management system, when a call is initiated from a first one of the hosts 30 (a calling party) to a second one of the hosts (a called party), the base station currently associated with the calling party sends a query message to the central database 18, requesting profile and location information associated with the called party. The central database system 14 is responsive to the query messages, and operative to provide the requested profile information and location information to the base station associated with the calling party.

As an example of a call processing function, a calling party using HOST_A, currently located in AREA_1, initiates a call to a called party using a second host designated HOST_B that is currently located in AREA_2. BASE_STATION_1 which covers AREA_1 must determine a profile of the called party by sending a request for the profile of the subscriber associated with HOST_B to the central database system 14 via one of the transaction servers 20. The central database system 14 is responsive to the request and operative to search the global subscriber list 40 (FIG. 2) stored in the central database 18 using a lookup key which is typically the phone number associated with HOST_B. BASE_STATION_1 receives an answer from the central database system 14, the answer including the profile associated with HOST_B and also indicating that the current location of the called party is AREA_2 associated with BASE_STATION_2. Based on this information, BASE_STATION_1 sends call setup information to BASE_STATION_2 in order to try to initiate the call.

One problem associated with the fully centralized cache management approach to managing subscriber information in the network 10 is the high volume of data and messages which must be received and processed by the central server 16 of the central database system. In order to handle such a high volume of data processing, the central server 16 is typically implemented using a fault tolerant computer system, which provides a great amount of processing power. However, such systems are very expensive, and also very difficult to maintain.

Another problem associated with the use of the fully centralized approach to managing subscriber information in the network 10 is that call processing operations are highly dependent on communications between the central database system 14 and the base stations 24. While the transaction servers 20 provide redundancy and fault tolerance for communications between the central database system 14 and the base stations 24, the network is still overly dependent upon the central database system 14.

For example, if there is a communication failure between a particular one of the base stations 24 and the central database system 14, then the particular base station is isolated from the central database system, and as a result, all call set up operations fail for all subscribers located in the coverage area associated with the isolated base station. Even though the central database system 14 includes fault tolerant machines and communication links, this problem still arises.

In order to reduce the high dependency on communications between the base stations 24 and the central database system 14, some prior art mobile communications networks provide a partially decentralized cache management mechanism wherein cache entries associated with selected subscribers of the system are periodically provided from the central database system to their associated owner ones of the base stations 24. In such systems, the base stations include local databases (not shown) for storing locally owned subscriber profile entries. In such systems, the locally stored cache entries are aged out, that is deleted upon expiration of a set time period if the local entries are not refreshed at the end of the time period. A counter counts down to indicate termination of the period, and if the local entry is not refreshed at the end of the countdown period, the local entries are aged out. Problems also arise in this partially decentralized cache management system because if the locally stored information is not refreshed by the central database system (for example due to communication link failure between the particular one of the base stations and the central database system) after a certain amount of time, the local information is aged out and ultimately the isolated base station fails even for processing all call operations including calls initiated between two subscribers within the same cell associated with the isolated base station. For example, assume that subscriber information associated with HOST_A and HOST_C has been locally stored at BASE-STATION_1, which currently owns the profiles associated with HOST_A and HOST_C. Assume now that the communication link between BASE_STATION_1 and the central database system 14 has failed, and that the profiles associated with HOST_A and HOST_C have been aged out. In this case, BASE_STATION_1 is unable to process any calls associated with HOST_A and HOST_C, including calls initiated between HOST_A and HOST_C.

As mobile communications networks expand with an increasing number of subscribers, coverage areas, and base stations, the conventional fully and partially centralized approaches to managing subscriber profile information, and location information, becomes more problematic and less feasible. Also, the amount of network traffic and network congestion becomes very difficult to handle.

Also, there are emerging plans to implement fully Internet protocol (IP) and to end enabled mobile communications networks wherein each of the base stations communicate via an IP network such as the Internet. The above described problems of network congestion are dependent on a central server associated with centralized cache management systems are even more problematic in an IP network wherein network traffic and congestion must be minimized in order to accommodate a wider variety of applications being supported by the network.

SUMMARY OF THE INVENTION

It is an object of the present invention to provide a location update protocol, which reduces the load on the central server/database by reducing queries for subscriber profiles. By reducing the number of queries per minute on the central server, a less powerful and more inexpensive server may be used for the central server site for managing location data.

Briefly, a presently preferred embodiment of the present invention includes a location update protocol for use in a mobile communications network having a distributed cache for managing subscriber profile information associated with each of a plurality of subscribers of the network. The network includes: a plurality of base stations communicatively coupled with each other via a backbone of the network, each of the base stations having an associated coverage area, and being operative to communicate via wireless communication links with subscribers using mobile hosts located within the associated coverage area.

Each of the base stations includes a memory unit having a local database for storing: a local subscriber list including a plurality of locally owned cache entries each having an associated subscriber key value, and an associated locally owned subscriber profile; and a global subscriber list including a plurality of global cache entries each having an associated subscriber key value, and an associated location value indicating a node in the network at which an associated subscriber profile is stored. Each of the base stations is operative to transfer and copy selected ones of the cache entries to other ones of the base stations via the backbone for the purposes of managing and accessing the distributed cache, and for supporting communications applications in the network in accordance with a distributed cache synchronization (DCS) protocol.

Each of the base stations may be operated in accordance with any DCS protocol to transfer a particular one of the cache entries to a new owner one of the base stations via the backbone upon execution of an associated handoff procedure. Each of the base stations is also operative in accordance with the DCS protocol to copy a particular one of the cache entries to a requesting one of the base stations via the backbone in response to receiving a cache entry copy request message from the requesting base station.

Each of the base stations can have an associated mirror base station list indicating at least one associated mirror one of the base stations. The local database of each of the base stations further provides for storage of a mirror subscriber profile list including a plurality of mirror cache entries each having an associated subscriber key value, and an associated mirror subscriber profile. Each of the base stations is operative to periodically transfer mirror copies of each of the associated locally owned cache entries to each of the associated mirror base stations via the back bone in accordance with the protocol. These mirror base stations may be base stations of the adjacent cells.

An important advantage of the location update protocol of the present invention is that it provides reduced dependency on the central database system, increased robustness, and improved fault tolerance in the network.

Another important advantage of the location update protocol of the present invention is that network traffic is reduced as a result of reducing the number of messages and data sent to and from the central database system.

A further advantage of the location update protocol of the present invention is that if ownership of a particular one of the subscriber profiles associated with a particular one of the hosts is transferred from an old one of the base stations to a new mirror base station associated with the old base station as a result of a hand off procedure executed while the particular host is engaged in a communication session controlled by the old base station, then transfer of control of the communication session to the new mirror base station is facilitated by the new mirror base station already having a copy of the particular subscriber profile Yet another advantage of the location update protocol of the present invention is that less expensive central computer systems may be used at the central database system as a result of reducing the processing requirements of the central computer system.

The foregoing and other objects, features, and advantages of the present invention will be apparent from the following detailed description of the preferred embodiment, which makes reference to the several figures of the drawing.

IN THE DRAWING

FIGS. 6A through 6D are table diagrams illustrating topology discovery, hierarchy building, and hierarchy maintenance information stored at each of the physical nodes, including the base stations, of the network of FIG. 3A for each of at least one logical node residing at the physical node;

FIG. 6E is a table diagram illustrating a neighbor list stored at each of the physical nodes of the network of FIG. 3A, the neighbor list indicating all neighboring nodes currently known to the associated physical node;

FIG. 6F is a table diagram illustrating a nodal hierarchy list stored at each of the physical nodes of the network that participates in at least one peer group of the nodal hierarchy structure established in the network;

FIGS. 7A through 7C are block diagrams generally illustrating the field structures of topology discovery, maintenance, and hierarchy building messages used in accordance with the DCS protocol of the present invention;

FIGS. 9A through 9K are block diagrams generally illustrating the field structures of DCS messages used in the DCS protocol which supports the location update protocol of the present invention.

DETAILED DESCRIPTION OF THE PREFERRED EMBODIMENTS

Figure 1:
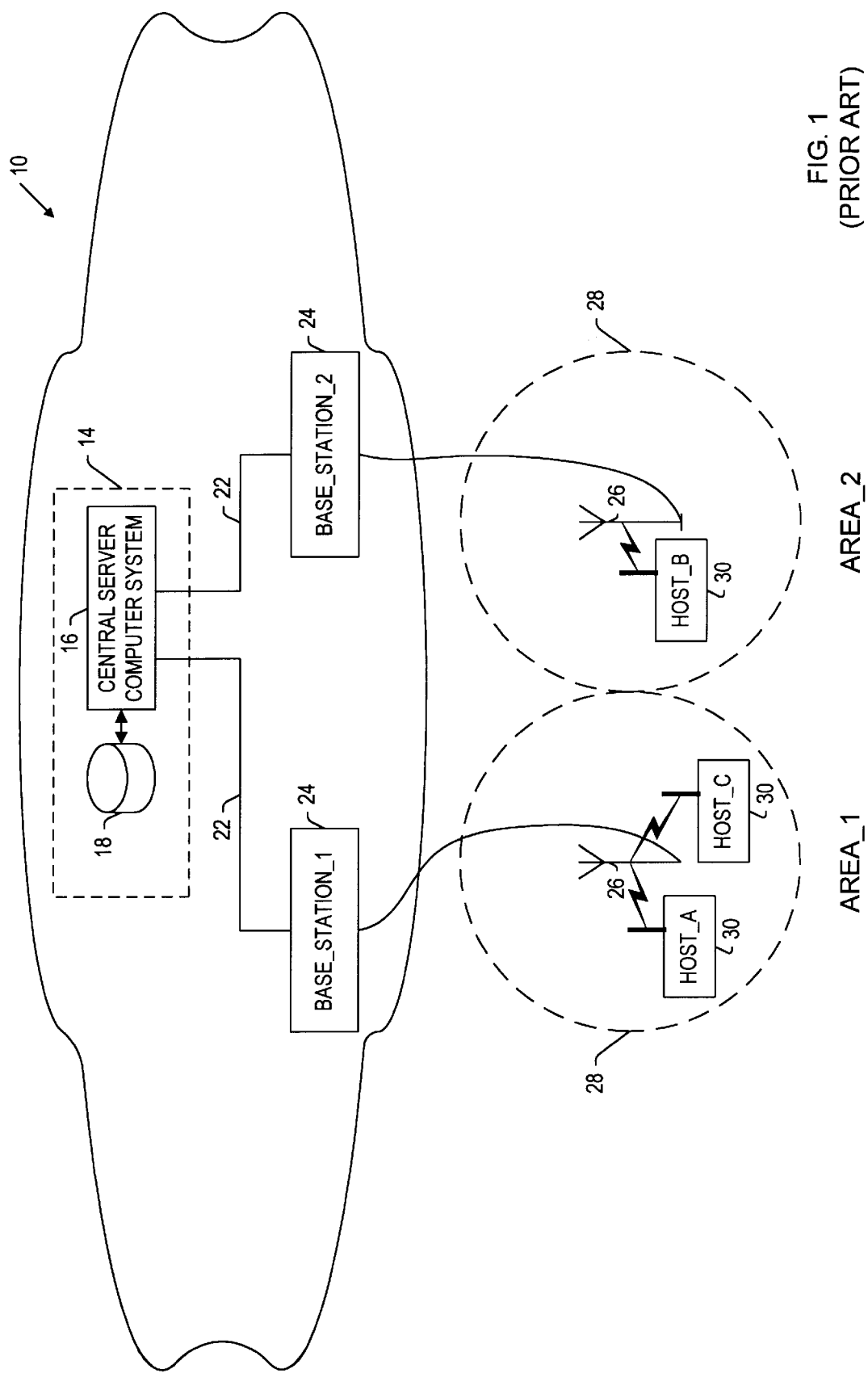
FIG. 1 is a generalized block diagram of a conventional wireless mobile communications network operated in accordance with a centralized cache management scheme for managing subscriber profile information.
Figure 2:
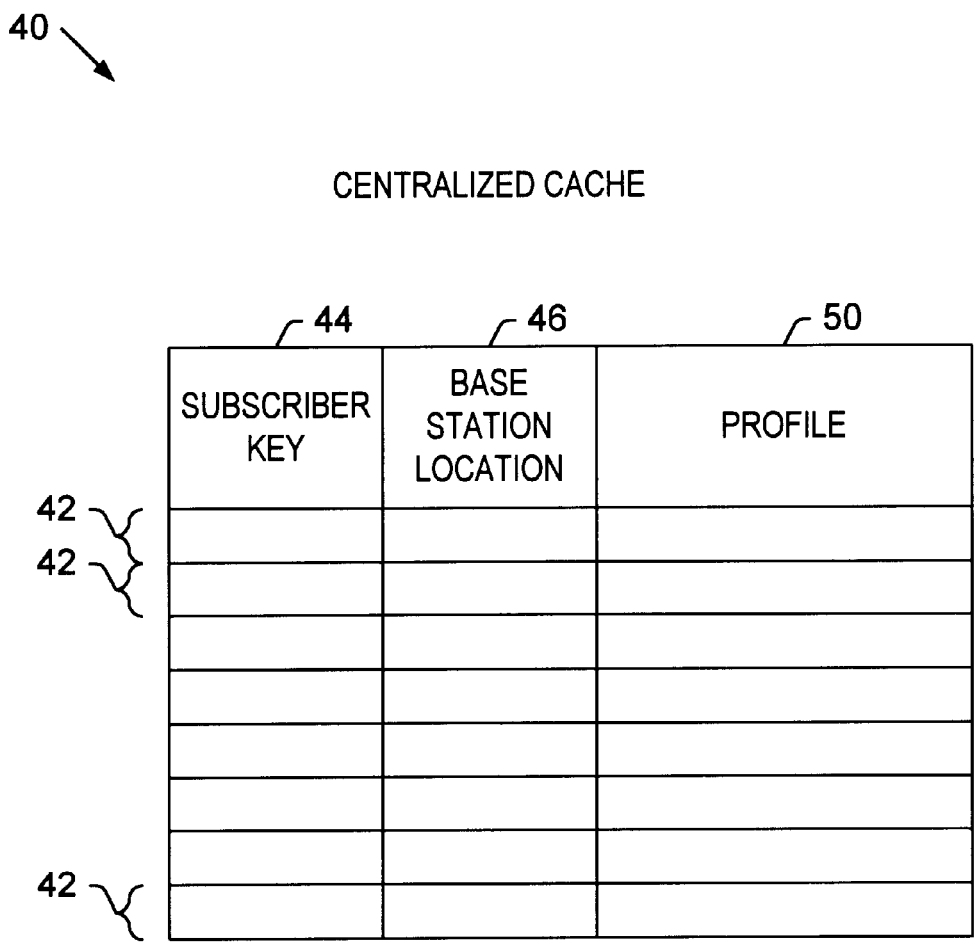
FIG. 2 is a table diagram illustrating subscriber profile information stored in a centralized database of a central database system of the conventional network of FIG. 1.
Figure 3A:
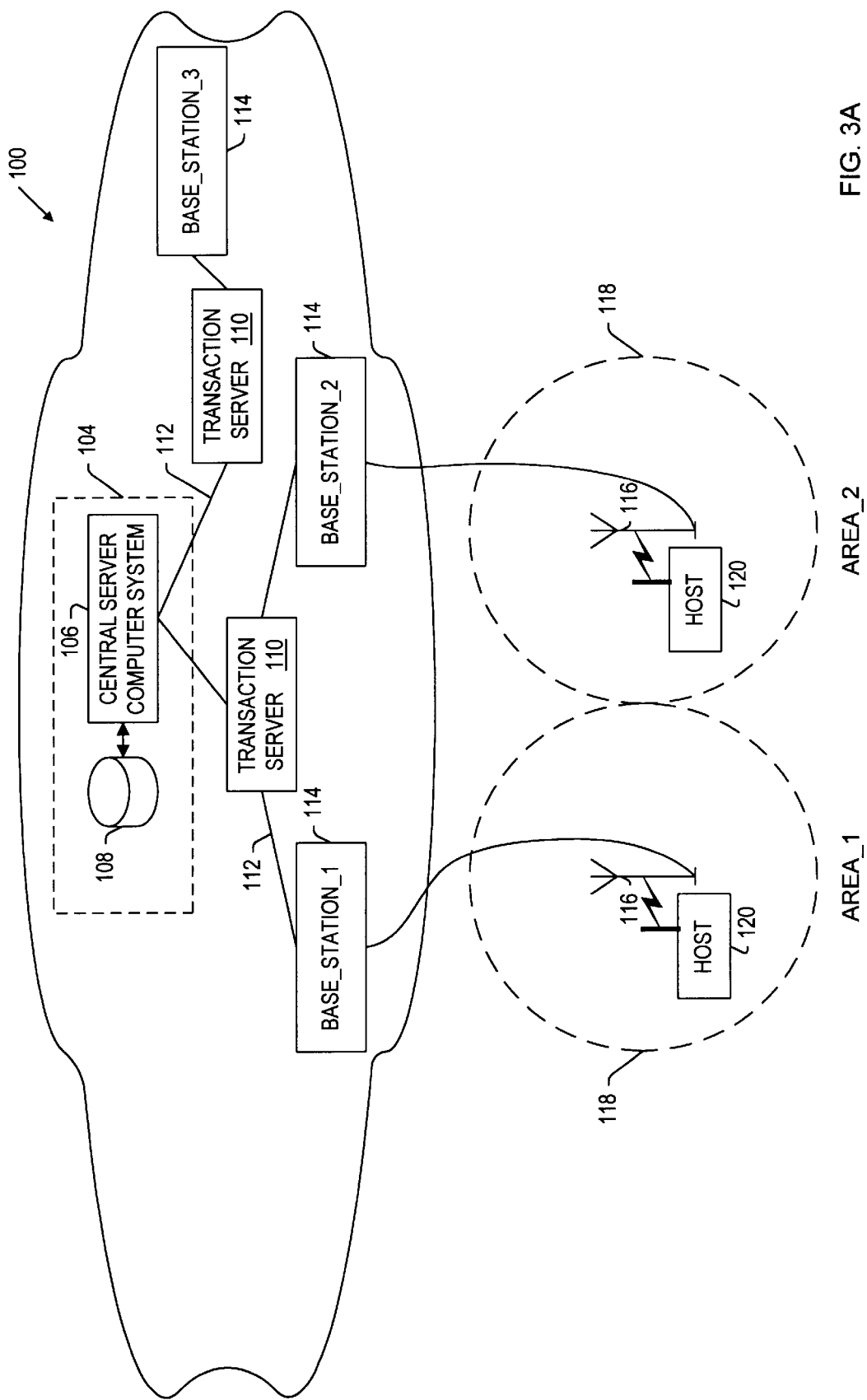
FIG. 3A is a generalized block diagram of a wireless mobile communications network in accordance with the present invention, the network having a distributed cache for managing subscriber profile information, and being operated in accordance with a location update protocol supported by a distributed cache synchronization (DCS) protocol.

FIG. 3A shows a generalized block diagram of a wireless mobile communications network at 100 in accordance with the present invention, the network 100 having a distributed cache system for managing subscriber profile information, and being operated in accordance with a location update protocol supported by a distributed cache synchronization (DCS) protocol each according to the present invention. The network 100 includes: a central database system 104 having a central server computer system 106, and a central database 108 communicatively coupled with the central server 106; a plurality of transaction servers 110 serving as real time front end interfaces of the central database system 104, and being communicatively coupled with the central server 106 via a backbone 112; and a plurality of base stations 114 communicatively coupled with each other, with the central database system 104, and with the transaction servers 110 via the backbone 112.

Each of the base stations 114 is communicatively coupled with an associated antenna 116, and is operative to communicate via wireless links with mobile hosts 120 located within an associated coverage area 118 of the base station. Each of the mobile hosts 120 may be a cellular telephone handset, a personal digital assistant (PDA), or a lap top computer having wireless communication capabilities. A first one of the base stations 114 designated BASE_STATION_1 is associated with a first coverage area designated AREA_1, and a second one of the base stations designated BASE_STATION_2 is associated with a second coverage area designated AREA_2. In one embodiment, each of the base stations 114 is communicatively coupled with its associated antennas via radio ports in accordance with the personal handing system (PHS) standard.

As further explained below, the network 100 of the present invention provides for storing subscriber profile information in a distributed cache wherein each of the base stations 114 includes a local data base for storing subscriber profile information. The distributed cache is managed in a accordance with a location update protocol supported by a distributed cache synchronization (DCS) protocol in accordance with the present invention. The distributed cache reduces dependency on the central database system 104 (FIG. 3A), and reduces traffic in the network 100 because base stations need not query the central database system every time subscriber profile information is required. The distributed cache also provides robustness in the network because call processing functions are not necessarily disabled if the link between a base station associated with a calling or called party) and the central database system fails because the subscriber profile information may be accessed locally at the base station and is not periodically aged out as in prior art partially decentralized cache management systems.

In one embodiment of the present invention, the network 100 uses the Internet protocol (IP) as a transport mechanism. Each of the nodes of the network 100 may be an end system node (ES node) or may be an intermediate system node (IS node) which relays packets. If the mobile hosts 120 are fully IP enabled, then the base stations 114 must provide end system functions as well as intermediate system functions, that is the base stations must route packets from the network 104 to the handsets 118 and back. In this embodiment, each of the mobile hosts 120 is fully IP enabled Using IP as the transport mechanism allows for providing more diverse services and makes it easier to add new services in the network 100. Note however that the topology discovery, maintenance and hierarchy building process, as well as the DCS protocol and location update protocol of the present invention are not limited to use in an IP network. Note also that any type of DCS protocol may be used.

The central database 108 provides central storage of: subscriber profile information associated with each subscriber of the network, the subscriber profile information including all information necessary for call processing operations; and location register information associated with each subscriber of the network, the location register information indicating the location of each of the subscribers in the network. In one embodiment, the location information includes a home location register database (HLR database) for storing cache data entries associated with local registered subscribers of the network, and a visitor's location register database (VLR database) for storing cache entries associated with roaming users of the network. When queried for location information (e.g. for call processing functions) via the transaction servers, the central database system 104 is operative to perform lookup functions, and provide profile information associated with subscribers as further explained below. However, because the network 100 includes the distributed cache for storing subscriber profile information, queries to the central database system 104 are minimized in the network 100 thereby allowing for the use of a less powerful and less expensive central server computer system 106 than is required in prior art mobile communications network which utilize a centralized cache management system. The central database system 104 further includes a subscriber management system, a billing system, and a network management system (not shown).

Figure 3B:
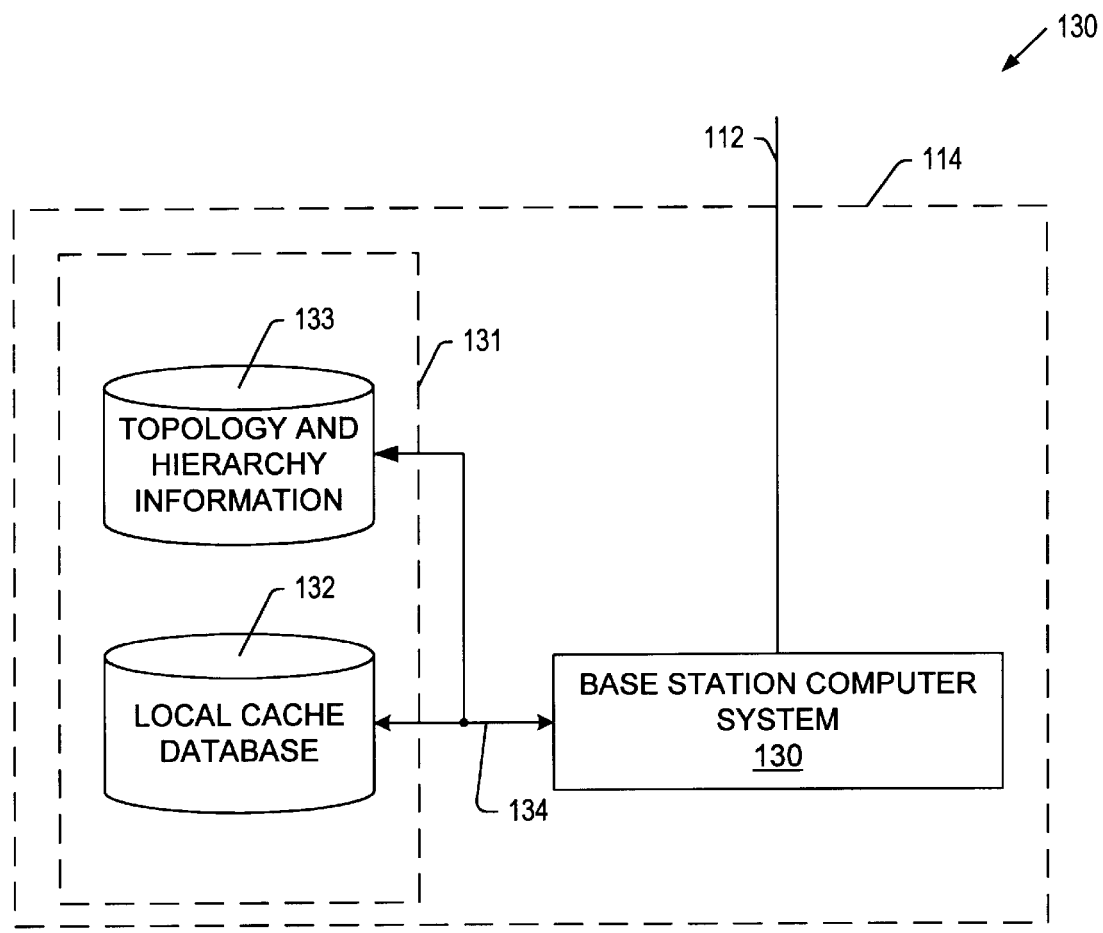
FIG. 3B is a generalized block diagram of components of a base station of the wireless mobile communications network of FIG. 3A.

FIG. 3B is a generalized block diagram of components of one of the base stations 114 of the wireless mobile communications network 100 (FIG. 3A). Each of the base stations 114 generally includes: a base station computer system 130 communicatively coupled with the back bone 112 of the network 100 (FIG. 3A); and a local memory storage system 131 having local cache database 132 communicatively coupled with the base station computer system 130 as illustrated by a line 134, and a topology and hierarchy information database 133 communicatively coupled with the base station computer system 130. The local cache database 132 of each base station provides for storing locally owned ones of the subscriber profiles as further explained below. The database 133 at each participating node of the network, including the base stations, provides for storing information used in the topology discovery hierarchy building, and hierarchy maintenance processes in accordance with one aspect of the present invention.

Referring back to FIG. 3A, when a subscriber using a host 120 located in a coverage area 118 initially signs on to the network 100, the base station associated with the coverage area must access the profile associated with the subscriber in order to perform communications functions such as call processing. In general, in accordance with the location update protocol of the present invention, the base station first searches its local cache database 132 (FIG. 3B) to determine if the profile associated with the subscriber is already stored in the local cache database 132 of the local base station. If the particular profile associated with the subscriber is not already stored at the local base station, then the particular subscriber profile must be retrieved either from another one of the base stations 114 (retrieved via the distributed cache) or must be retrieved from the central database (retrieved via the centralized cache) through the transaction servers if it is absolutely necessary as is fully explained below. After the base station retrieves the particular subscriber profile, the base station performs an authentication procedure on the subscriber, and assuming that it passes the authentication procedure, the subscriber is then registered on the network. The local base station becomes the "owner" of the profile, and the profile is stored in the local cache database 132 of the base station if it was not previously stored locally. Generally, as the subscriber moves from one coverage area to another, the location update process of the present invention ensures that the profile migrates with him/her from one base station to another. From the network's point of view, the location of the subscriber is the same as the location of its profile. The location update protocol is used to keep track of the migration of subscriber profiles as the subscriber moves through the network. In accordance with the location update protocol, when a call is made for the subscriber, its location can be quickly determined and its profile can be retrieved. Generally, when a subscriber moves from one base station to another, and a handoff procedure is performed, the ownership of the profile transfers from the old base station to the new base station. The location of a subscriber in the network 100 is identified by the IP address of the particular one of the base stations 114, which currently owns the subscribers, profile. The location update protocol provides location management services which are supported by distributed cache management services, implemented in accordance with the DCS protocol, which are in turn supported by nodal hierarchy protocol services all in accordance with different aspects of the present invention. At a higher level of operation of the network 100, call-processing services are supported by the location update protocol services.

Figure 4A:
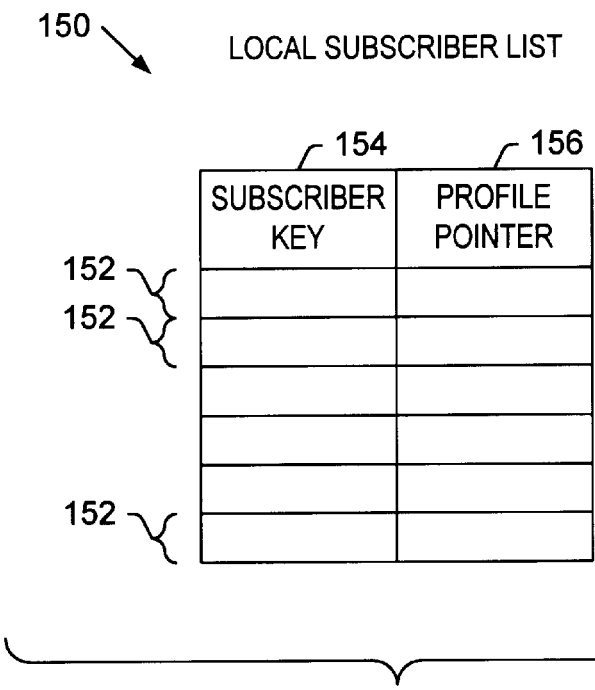
FIGS. 4A through 4C are table diagrams generally illustrating distributed cache information including subscriber profile information stored at each of the base stations of the network of FIG. 3A.

FIG. 4A shows a table diagram illustrating a local subscriber list at 150 that is stored in the local cache database 132 (FIG. 3B) of one of the base stations 114 (FIG. 3A) in accordance with the present invention, the local subscriber list 150 including a plurality of local subscriber cache entries 152 each being associated with a subscriber that is currently owned by the local base station. A subscriber is owned by a base station if the subscriber is currently active on the base station by virtue of currently participating in a call using an associated mobile host within the base station's coverage area, or by virtue of being in a stand-by mode within the base station's coverage area. In the present invention, a subscriber is also owned by a local base station if the subscriber has become inactive within a profile keep alive duration after being active on the base station. Stated alternatively, the local subscriber list 150 includes cache entries 152 for subscribers that have become inactive within a profile keep alive duration after having been active on the base station.

Each of the local subscriber cache entries 152 includes: a subscriber key field 154 for storing a subscriber key value associated with the subscriber and with an associated one of the mobile hosts 120 (FIG. 3A) that is in turn associated with the subscriber; and a profile pointer field 156 for storing a memory address pointing to an associated subscriber profile stored in the data base 132 (FIG. 3B) at the base station. Each of the subscriber profiles includes all information required for call processing. In one embodiment, each of the profiles further includes a version number comprising a two digit decimal value as further explained below. Also in an embodiment, the subscriber key value comprises a concatenated value including the telephone number of the associated subscriber, and the link layer ID (e.g., manufacturers ID) of the associated one of the mobile hosts 120 (FIG. 3A). Therefore, the local subscriber list 150 may be searched using either a link layer ID, or a telephone number associated with the subscriber.

In accordance with the location update protocol of the present invention, at least one of the base stations 114 (FIG. 3A) has at least one associated mirror base station. In one embodiment, the mirror base stations associated with each base station 114 (FIG. 3A) may be specified by a network administrator who programs the base station to store the IP addresses of the associated mirror base stations. In an alternative embodiment, the mirror base stations associated with each base station may be learned in accordance with a neighborhood discovery process. Also in an embodiment, a mirror site list associated with each one of the base stations 114 (FIG. 3A) is stored in the transaction server 110, and each of the base stations may query the transaction server, upon power up of the base station, for its associated mirror list. Further, in one embodiment, the mirror lists include IP addresses associated with the mirror base stations.

The mirror base stations associated with each particular one of the base stations 114 (FIG. 3A) generally include base stations associated with coverage areas 118 (FIG. 3A) which are located adjacent the coverage area associated with the particular base station. The mirror base stations associated with a particular base station may also include base stations having logically associated coverage areas based on common travel patterns. As an example, the network 100 (FIG. 3A) may cover two cities or regions, not adjacent to each other, between which subscribers commonly travel. As an example, the mirror base stations associated with a first base station covering a first area may include a second base station covering a second area that is not adjacent the first area, wherein subscribers commonly travel via air travel between the first and second coverage areas.

In accordance with the location update protocol of the present invention, each of the base stations 114 (FIG. 3A) is operative to copy each of its locally owned subscriber cache entries 152. The present invention provides a great advantage in copying the subscriber cache entries 152 of the local subscriber list 150 from each base station to its associated mirror base stations because this facilitates faster hand-off procedures and also provides a more seamless transition of profiles from one part of network to another. As an example, suppose that a particular subscriber using one of the mobile hosts 120 (FIG. 3A) crosses a boundary between a first coverage area, covered by a first base and a second coverage area covered by a second base station. If the second base station is a mirror of the first base station, then the second base station need not retrieve the profile of the particular subscriber from the central database system 104 (FIG. 3A), or from the first base station, because the second base station already has the profile of the particular subscriber.

Figure 4B:
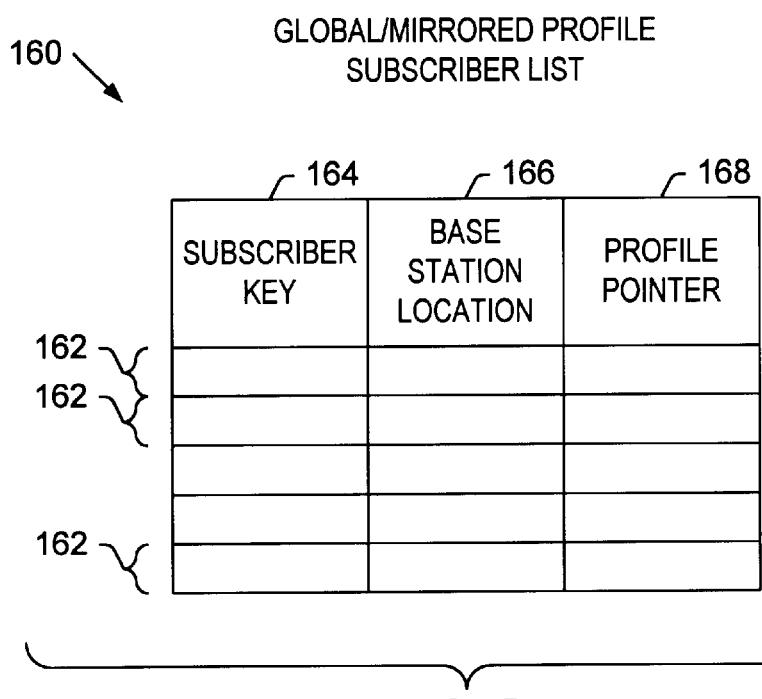

FIG. 4B shows a table diagram illustrating a global/mirror subscriber list at 160 that is stored at each of the base stations 114 (FIG. 3A) in accordance with the present invention. In the described embodiment, the list 160 includes both the global subscriber list and a mirror subscriber list as further described below. In an alternative embodiment, the two lists are separate lists. The global/mirror subscriber list 160 includes a plurality of global/mirror subscriber cache entries 162, each having: a subscriber key field 164 for storing a subscriber key value associated with one of the subscribers currently maintained by the DCS protocol (in the distributed cache) in the wireless mobile network 100 (FIG. 3A); a base station location field 166 for storing the IP address of an associated owner base station which currently owns the profile of the associated subscriber, that is the base station which currently stores the profile of the associated subscriber in its local subscriber list 150 (FIG. 4A); and a profile pointer field 168 for storing a memory address pointing to an associated profile if the associated cache entry is included in the local mirror list, and not just in the global list, as further explained below.

As in the local subscriber list, each of the subscriber key values stored in the subscriber key fields 164 comprises a concatenated value including the telephone number of the associated subscriber, and the link layer ID of the associated one of the mobile hosts 120 (FIG. 3A) that is associated with the subscriber. Each of the subscriber profiles is stored in the database 132 (FIG. 3B) at the local base station, and includes all information required for call processing. In one embodiment, each of the profiles further includes a version number comprising a two digit decimal value as further explained below.

As mentioned, the global/mirror subscriber list 160 includes both the global subscriber list and the mirror subscriber list of the associated base station. For each cache entry 162 which is included in both the mirror list and the global list, the profile pointer field 168 stores a memory address pointing to an associated subscriber profile stored in the profile data base 132 (FIG. 3B) at the local base station. For each cache entry 162 which is not included in the mirror list, the profile pointer field 168 is empty, or stores a null pointer value indicating that the associated subscriber profile is not stored locally.

After a particular subscriber turns off an associated mobile host 120 (FIG. 3A), the profile associated with the particular subscriber is maintained at the owner base station and its associated mirror base stations for a period of time before the profile is expired and deleted by the base stations. The duration for which a profile is maintained by the base stations of the network, after the associated subscriber is off the network, is called the profile keep alive duration. The purpose of maintaining the profile after the subscriber has signed off from the network is to avoid having to query the central database via the transaction servers in the event that the subscriber turns the handset back on after a short period of time. The profile keep alive duration may be varied and may be quite long such as on the order of hours or the days instead of minutes. The profile keep alive feature reduces dependency on the central database system 104 (FIG. 3A) and reduces traffic in the network.

Each of the base stations 114 (FIG. 3A) is operative to transmit copies of the subscriber cache entries 152 of the local subscriber list 150 (FIG. 3A) to its associated mirror base stations one at a time, as subscribers are authenticated by the base station, in accordance with the location update protocol of the present invention as further explained below. In another embodiment, each of the base stations is operative to periodically transmit copies of all of the subscriber cache entries 152 of the local subscriber list 150 to its associated mirror base stations. The location update protocol of the present invention, supported by the DCS protocol, provides for managing the locations of cache entries in the distributed cache of the network.

Figure 4C:
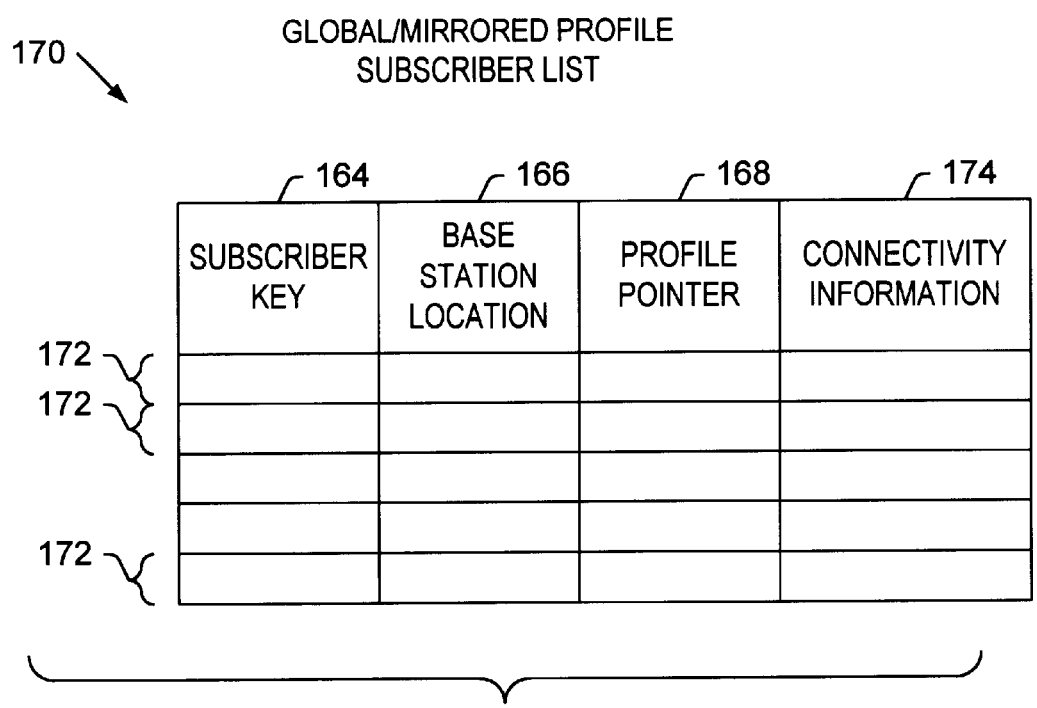

FIG. 4C shows a table diagram illustrating an alternative embodiment of a global/mirror subscriber list at 170 that is stored at each of the base stations 114 (FIG. 3A) in accordance with the present invention. In the depicted embodiment, each of the cache entries 172 includes the subscriber key field 164, base station location field 166, and profile pointer field 168 as well as a connectivity information field 174. The connectivity information field 174 stores information indicative of a contributing node, or relay node, of the network 100 (FIG. 3A) which provided the information associated with the cache entry in accordance with the DCS protocol. The connectivity information field 174 is provided for purposes of assuring data integrity in the distributed cache that is managed in the network 100 (FIG. 3A). Use of the connectivity information is further explained below.

Figure 5:
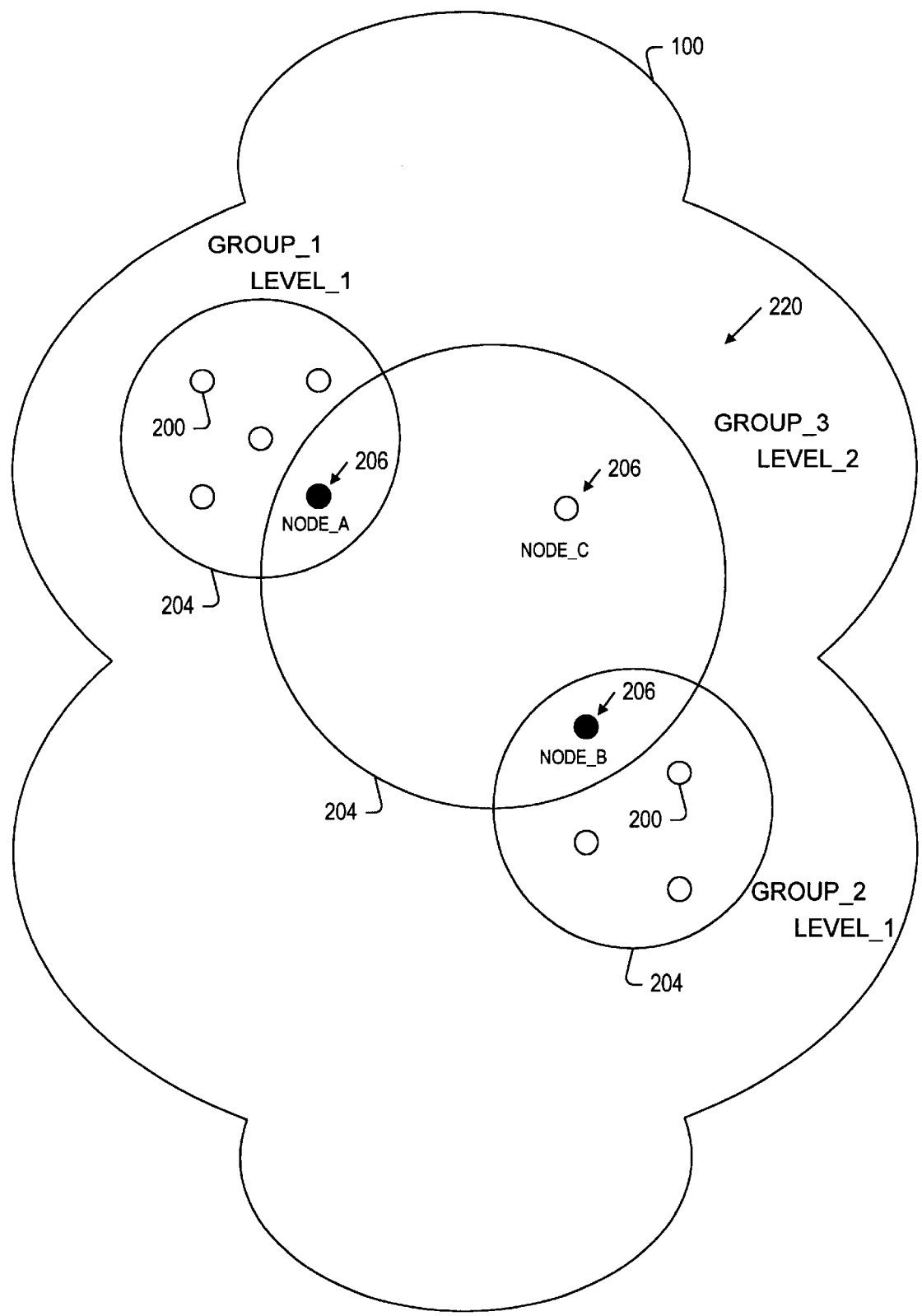
FIG. 5 is a network topology diagram illustrating an exemplary hierarchical structure established in the mobile communications network of FIG. 3A in accordance with topology discovery, hierarchy building, and hierarchy maintenance protocol operations of the DCS protocol of the present invention.

FIG. 5 shows a network topology diagram illustrating an exemplary hierarchical structure established in the mobile communications network 100 (FIG.3A) in accordance with topology discovery, hierarchy, and hierarchy maintenance processes of the present invention. It will be understood that the process of the present invention may be practiced with any type of distributed cache synchronization protocol. However, in a preferred embodiment, the process of the present invention is used with a DCS protocol as described in co-pending and commonly assigned US patent application entitled "DISTRIBUTED CACHE SYNCHRONIZATION PROTOCOL", filed on Nov. 22, 2000, which is incorporated herein by reference.

In accordance with the present invention, in order to provide structure on the network operating in accordance with the DCS protocol, it is desirable to have some organization between nodes of the network in order to manage updates and refresh cache entries in a more controlled way. Therefore a hierarchical structure is implemented among participating nodes 200 of the network 100 (FIG. 3A) in order to form peer groups identified by peer group identification values. As further explained below, the advantage of the hierarchical structure is that it reduces the number of messages, which need to be exchanged in the network in order to manage the distributed cache. Each of the nodes 200 may be a router, a switch, or one of the base stations 114 (FIG. 3A) of the network 100 (FIG. 3A). A hierarchy is established in order to provide an organization of the nodes so that the distributed cache information may be more efficiently exchanged in the network. In accordance with a neighbor discovery process further explained below, each node 200 in the network discovers associated neighboring nodes. The nodes 200 are organized in peer groups 204, and a peer group leader 206 is elected in each peer group. Peer groups are established on multiple levels. To form and maintain a peer group, peer group hello messages are exchanged among the members of the peer group as further explained below.

With formation of each of the peer groups 204, a peer group leader 206 is elected. The peer group leader 206 on one level can in turn form peer groups on a next level. When a new peer group is formed on an upper level, the peer group leaders will update its nodal hierarchy list with the upper level peer group peer group leader and its peer group leader leadership priority. The peer group leaders will send the updated nodal hierarchy list to their perspective peer groups.

In the depicted network diagram, a first peer group 204 designated GROUP_1 is formed on a first level designated LEVEL_1, and an elected peer group leader 206 of GROUP_1 is designated NODE_A. A second peer group 204 designated GROUP_2 is also formed on LEVEL_1, and the peer group leader 206 of GROUP_2 is designated NODE_B. In this example, the physical nodes designated NODE_A and NODE_B participate in the LEVEL_1 peer groups designated GROUP_1 and GROUP_2, and each of NODE_A and NODE_B also participate in an additional peer group 204 designated GROUP_3 which is established on a level designated LEVEL_2 which is a higher level then LEVEL_1. An elected peer group leader 206 of GROUP_3 is designated NODE_C.

Figure 6A:
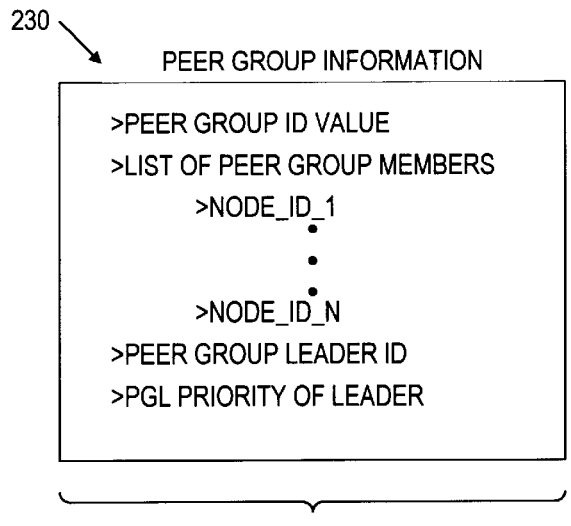

FIG. 6A shows a table diagram at 230 illustrating peer group information stored in the database 133 (FIG. 3B) of each of the physical nodes 200 (FIG. 5) of the network for each logical node residing at the physical node. One logical node exists at a physical node for each peer group, which the physical node participates in. Each logical node participates in one peer group on one level of the hierarchical structure of the network. For each logical node, the peer group information stored at the physical node includes: a peer group ID value indicating the peer group which the logical node participates in; a list of currently known peer group members, each being indicated by an associated node identification value (node ID); a peer group leader ID value indicating the locally determined leader of the peer group as further explained below; and a peer group leader priority value (PGL priority value) of the peer group leader. Each logical node determines and maintains its list of peer group members at a given level in accordance with topology discovery, maintenance, and hierarchy building protocol operations of the present invention. In an embodiment, the peer group ID value is a 32-bit value for uniquely identifying the associated peer group.

Figure 6B:
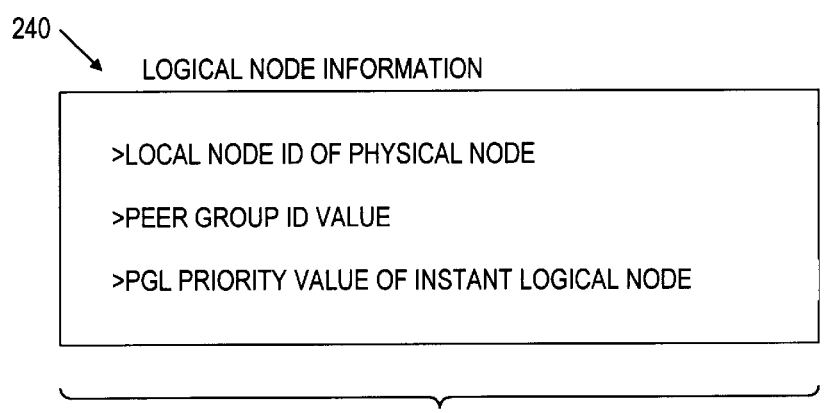

FIG. 6B shows a table diagram illustrating logical node information stored at 240 in the database 133 (FIG. 3B) of each of the physical nodes 200 (FIG. 5) of the network for each logical node residing at the physical node. For each logical node, the logical node information stored at the physical node includes: a local physical node ID value indicating the local physical node at which the logical node resides; a peer group ID value indicating the peer group which the particular logical node participates in; and a PGL priority value of the corresponding logical node. In an embodiment, peer group ID value, peer group leader value, and peer group priority values are assigned to each one of the nodes during a configuration process by an administrator of the IP network 100 (FIG. 3A) in accordance with network topology considerations and geographical considerations.

A peer group leader may elect to use multicast for peer group communication. A process wherein all nodes in a peer group elect a peer group leader is referred to as peer group leader election. Along with peer group ID, each node is also configured with a leadership priority at each level. In a given peer group, the node that has the highest leadership priority and a highest node ID among the node with the same leadership priority is determined to be the peer group leader of the peer group. With the exchange of peer group hello messages, as further explained below, each logical node in the peer group learns about other logical nodes' leadership priority and their node ID. Each logical node independently determines a peer group leader.

In the election procedure, peer group hello messages are developed by each of the nodes 200 (FIG.5) and sent to associated neighboring nodes. Upon receiving a peer group hello message, each of the nodes initiates an election procedure. Each of the nodes 200 is operative to execute the same election procedure using an identical algorithm wherein the leader of the peer group is determined based on the peer group leadership priority values of each node in the group. However the data set (including PGL priority values for the members of the group) provided to each of the nodes may be different, and therefore the election procedure may yield different results at different ones of the members. The results of the election procedure are therefore only different if a different data set is provided to the nodes. It is possible that a particular one of the nodes 200 may determine a different peer group leader based on a different data set because the particular node has yet to discover certain members of the peer group. For example a first one of the nodes 202 has discovered ten neighboring nodes, and the second one of the nodes 202 has powered up subsequently, and has only discovered nine fellow members of the peer group. Therefore one of the peer group members may only have partial knowledge of the other members of the peer group and therefore may elect a different leader of the peer group. But ideally, the erroneously elected peer group leader has full knowledge of the peer group members, and will proceed to indicate this. If there is a conflict, the actual peer group leader sends a peer group hello message declaring himself as the peer group leader, and the false peer group leader receives the peer group hello message, and executes an election procedure based on the peer group leader priority value of the source node.

Figure 6C:
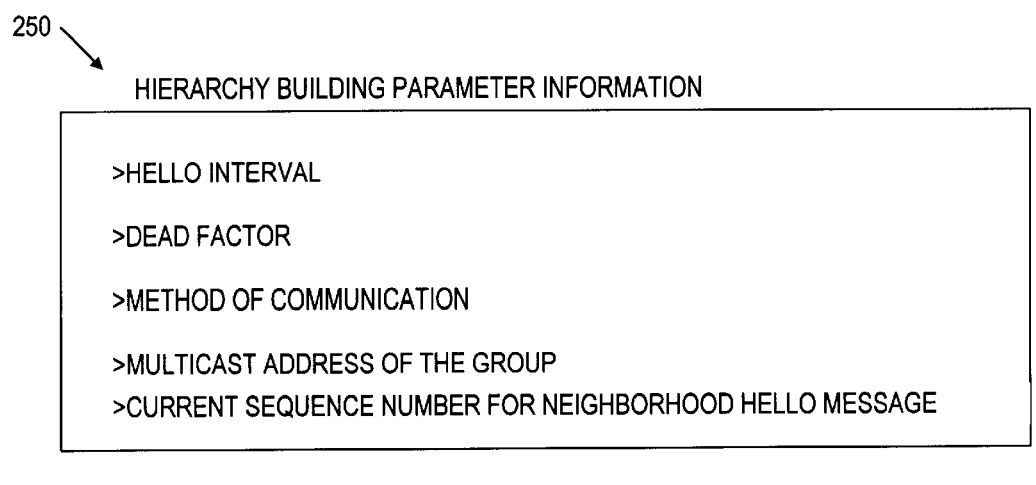

FIG. 6C shows a table diagram at 250 illustrating hierarchy building parameter information stored in the database 133 (FIG. 3B) of each of the associated physical nodes 200 (FIG. 5) of the network for each logical node residing at the physical node. For each logical node, the hierarchy building parameter information stored at the physical node includes: a hello interval value; a dead factor value; a method of communication value; a multicast address of the peer group which the logical node participates in (if the multicast method of communication is used by the group); and a current sequence number for neighbor hood hello messages sent by the logical node. In one embodiment, the parameters of table 250 are configured by a network administrator.

Methods by which the members of a peer group communicate include flooding and multicast. If the flooding method is used, all nodes in a peer group send messages to all members of the same peer group in its neighborhood. Upon receiving a message from a node in the peer group, the receiving node then sends the message to all its neighbors except the one from which the message is received. A peer node also keeps track of the sequence number of messages received from all other peers. When a message with the same sequence number is received again, it is dropped.

FIG. 6D shows a table diagram at 260 illustrating peer group hello parameter information stored in the database 133 (FIG. 3B) of each of the physical nodes 200 (FIG. 5) of the network for each logical node residing at the physical node. For each logical node, the peer group hello parameter information stored at the physical node includes: a plurality of peer group member ID values, each indicating an associated fellow member of the peer group which the logical node participates in; a plurality of time stamp values each indicating the time of arrival of a most recently received peer group hello message received from the associated one of the fellow peer group members; and a plurality of sequence numbers each indicating the sequence number of an associated one of the most recently received peer group hello messages. As further explained below, each logical node is operative read the time stamp values associated with each of the most recently received peer group hello messages, and determine if a predetermined time interval (determined by the product of the hello interval and the dead factor stored in table 250 of FIG. 6C) has elapsed since the arrival of the most recently received peer group hello message from an associated one of the peer group members. If it is determined that the predetermined time interval has elapsed since the arrival of the most recently received peer group hello message from a particular peer group member, then it is assumed that there has been a communication link failure between the particular peer group member and the local node, and appropriate action is taken to ensure that the distributed cache of the network functions properly as further explained below.

FIG. 6E shows a table diagram at 270 illustrating a neighbor list stored in the database 133 (FIG. 3B) of each of the physical nodes 200 (FIG. 5) of the network. The neighbor list 270 includes: a plurality of neighboring node ID values associated with nodes 200 (FIG. 5) of the network which are considered neighbors of the local physical node; and a plurality of hop numbers, or time to live (TTL) radius values, associated with each one of the neighboring nodes.

A time to live count value (TTL count value) is included in the neighborhood hello messages. As a neighborhood hello message propagates throughout the network, its TTL count value is decremented by each of the nodes 200 (FIG. 5) which receives and forwards the neighborhood hello message to the next one of the nodes. If the TTL value reaches zero, the neighborhood hello message is dropped and not propagated. The original TTL value is determined by the network administrator based on network topology considerations. Upon receiving a neighborhood hello message, each of the node decrements the TTL count value, and forwards the message to a next node. The neighborhood hello message may be sent by flooding, or by broadcasting in accordance with IP network broadcast methods. In accordance with the present invention, when a neighborhood hello message having a predetermined original TTL value is received at a destination node from a source node, it is assumed that the source and destination nodes are neighbors because the message reached the destination node within the predetermined TTL propagation radius.

As further explained below if the neighborhood hello message is received from a new fellow member of a peer group, the node determines this by comparing the source IP address to the list of peer group members as further explained below. If the neighborhood hello message is determined to have been sent by a new member, the node sends back a peer group hello message to the source.

FIG. 6F shows a table diagram at 280 illustrating a nodal hierarchy list stored in the database 133 (FIG. 3B) of each of the physical nodes 200 (FIG. 5) of the network which participates in at least one peer group of the nodal hierarchy structure. The nodal hierarchy list 280 includes a plurality of peer group ID values indicating the peer groups, which the physical node participates in. In one embodiment of the present invention, the order of the peer group ID values stored in the nodal hierarchy list 280 indicates the levels of each group. A physical node may only participate in one peer group on a given level.

Figure 7A:
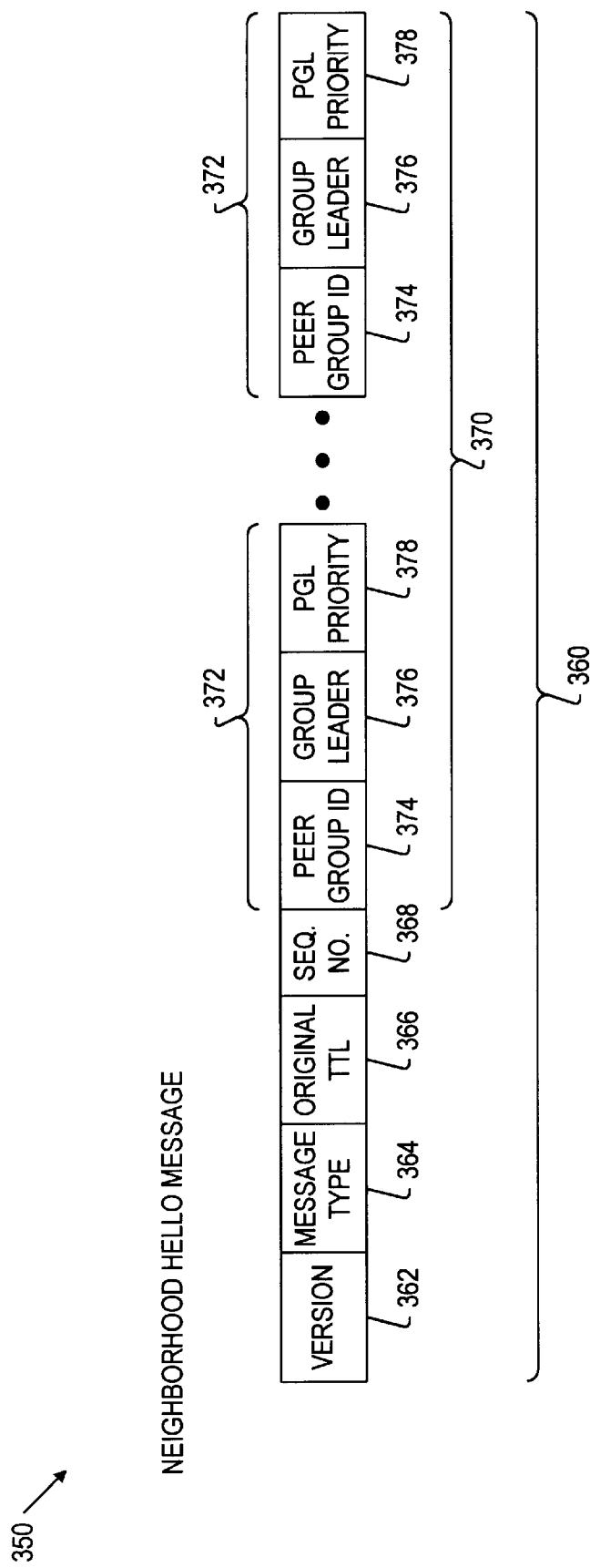

FIG. 7A shows a block diagram generally illustrating the field structure of a neighborhood hello message at 350 as used in accordance with topology discovery, maintenance, and hierarchy building protocol operations of the present invention. Upon initialization, each node including the base stations 114 (FIG. 3A) of the network, periodically send out neighborhood hello messages on all network interfaces of the node. As further explained below, each neighborhood hello message carries information derived from the nodal hierarchy list 280 (FIG. 6F) of the source node sending the neighborhood hello message. Upon receiving a neighborhood hello message, the receiving node will reply with its own neighborhood hello message via regular unicast methods, the reply containing information derived from the nodal hierarchy list of the replying node. By exchanging nodal hierarchy information, two nodes may exchange knowledge of the established hierarchy in the network, and may determine whether the two nodes belong to a same peer group at any level that is known to them.

Neighborhood hello messages may be sent by either broadcasting or flooding methods. Flooding is achieved in the DCS protocol layer, while broadcasting is achieved in the IP layer. In accordance with flooding, upon receiving a packet via a particular interface of one of the nodes, the node duplicates the message and sends the message via other interfaces of the node. If the interface of a node is a point to point link, neighborhood hello messages are sent as unicast messages to nodes at opposite ends of the link. If the interface of the node is a broadcast link, the message is sent as a broadcast message to a link or subnet. Flooding is achieved via the code running the protocol at each of the nodes 202. As mentioned above, the neighborhood hello message is a scoped message with a predetermined TTL value.

In one embodiment, broadcast is achieved by IP network broadcasting methods. As further explained below, if the neighborhood hello message is received from a new fellow member of a peer group, the receiving node determines this by comparing the source IP address of the message to the peer group information list 230 (FIG. 6A) as further explained below. If the neighborhood hello message is determined to have been sent by a new member, the node sends back a peer group hello message to the source. Because each of the nodes may belong to more than one of the peer groups, the neighborhood hello messages may include more than one group ID field, group leader field, PGL priority field.

Neighboring status for each of the nodes 202 is determined by sending the neighborhood hello message 250 (FIG. 4A). The neighborhood hello message 250 is sent with a predetermined time to live value being carried in the original TTL field 266 (FIG. 4A). If the neighborhood hello message 250 reaches a node within the time to live propagation, then the source node and destination nodes are assumed to be neighbors. Note that the neighborhood hello message includes at least one peer group ID field 270 indicating a corresponding peer group leader. Note also that the peer groups are hierarchical. As mentioned, a node may be a member of multiple peer groups, and if so, the peer group hello message will include multiple sets of peer group parameters, each including a peer group ID, group leader, and PGL priority.

The neighborhood hello message 350 includes: a TTL count value that is decremented by each node which relays the message 350 as it is propagated. The Payload 360 includes: a version field 362 for carrying a value indicative of the version of the DCS protocol, the version field enabling updates of the protocol; a message type field 364 for carrying a value indicating that the message 350 is a neighborhood hello message; an original TTL value field 366 for carrying an original TTL radius value set by the source node for propagation of the message 350, the original TTL value being useful to any receiving nodes for purposes of determining the hop number for propagation between the source node and receiving node via the network; a sequence number field 368 for carrying a sequence number value indicative of the sequence number of the particular hello message as further explained below; and a field group 370 for carrying information associated with each node listed in the nodal hierarchy list 280 (FIG. 6F) of the source node sending the message.

The field group 370 includes at least one field sub-group 372 for carrying information associated with one peer group which the source node participates in. Each field sub-group 372 includes: a peer group ID field 374 for carrying a value indicating an associated peer group in which the source node participates; a peer group leader field 376 for carrying a value indicative of the peer group leader of the associated peer group; and a peer group leader priority field (PGL priority field) 378 for carrying a priority value indicating the priority assigned to the peer group leader indicated in the associated field 376. In an embodiment, the field subgroups 372 associated with peer groups identified in the nodal hierarchy list of the source node are transmitted in order beginning with the lowest level peer group in the nodal hierarchy list of the source node to the highest level peer group in the nodal hierarchy list.

The TTL count value is initially set to the original TTL value which defines a scope or radius for propagation of the neighborhood hello message 350. In an embodiment, the original TTL value is determined by a network administrator based on network topology considerations. The TTL count value is decremented by each of the nodes, which receives and forwards the neighborhood hello message to the next one of the nodes. If the TTL value reaches zero, the neighborhood hello message is dropped and not propagated. Upon receiving a neighborhood hello message, each of the node decrements the TTL value carried by the TTL field, and forwards the message to the next node. If the neighborhood hello message sent by a source node reaches a receiving node within the TTL radius, then it is assumed in the present invention that the source node and receiving node are neighbors. As further explained below, in accordance with a neighbor discovery process of the present invention, if no neighbors are discovered by a node using neighborhood hello messages within a predetermined period of time (determined by the product of a dead factor value and a neighborhood hello interval), then the original TTL value may be incremented to define a larger TTL radius.

Each node sending neighborhood hello messages 350 increases the sequence number carried in field 368 of the messages each time another neighborhood hello message 350 is sent. The sequence numbers carried by the sequence number fields 368 of the neighborhood hello messages are used by the nodes receiving the neighborhood hello messages to determine if a same neighborhood hello message has been received more than once. In accordance with flooding transmission methods, each node receives messages at a first port and sends messages via other ports. So, more than one of a particular flooding message may be received at a particular receiving node. Therefore, the receiving nodes use the sequence numbers to determine if a same message is received more than once.

Upon receiving a neighborhood hello message 350, the neighboring node will reply with its own neighborhood hello message via regular unicast, the reply containing information associated with each node in the nodal hierarchy list of the replying node. With the exchange of nodal hierarchy list information, the two nodes will learn each other's knowledge of the hierarchy. In this manner, the nodes exchanging neighborhood hello messages can determine whether the two nodes belong to same peer group at any level that is known to them. In one embodiment, the sequence number is a 32-bit value.

FIG. 7B shows a block diagram generally illustrating the data structure of a peer group hello message at 380 in accordance with topology discovery, maintenance, and hierarchy building protocol operations of the present invention. To form and maintain a peer group 204 (FIG. 5), peer group hello messages are exchanged among the members of the peer group. Peer group hello messages are only exchanged among known members of a peer group. It is important that Peer group hello messages are not sent to any node outside of a given peer group so that the cache alignment process will not be problematic. Peer group hello messages are sent by either flooding of multicast methods.

The peer group hello message 380 includes: an address of the source one of the nodes 200 (FIG. 5) sending the peer group hello message 380, and a TTL count value. The peer group hello message 380 also includes a payload which carries: a DCS protocol version field 390; a message type field 392 for carrying a value indicating that the message is a peer group hello message; a sequence number field 394 for carrying a sequence number of the particular peer group hello message sent by the source node; a field group 396 for carrying information associated with each node in the nodal hierarchy list 280 (FIG. 6F) of the source node sending the message; a hello interval field 398 for carrying a hello interval value indicating the time interval between which peer group hello messages are sent by the source node; a dead factor interval field 400 for carrying a dead factor value for defining a time out interval as further explained below; a node leadership priority field 402; for carrying a node leadership priority value indicating the PGL priority of the source node a peer group communication method field 404 for carrying a value indicating the communication method (broadcast or flooding) by which the peer group communicates; and a peer group multicast address field 406 for carrying a multicast address if the communication method indicated in field 404 is broadcasting.

For peer group members other than the peer group leader, the field group 396 for carrying the nodal hierarchy list is optional. The field group 396 information associated with each node includes at least one field sub-group 408 for carrying information associated with one-peer group which the source node participates in. Each field sub-group 408 includes: a peer group ID field 410 for carrying a peer group ID value indicating an associated peer group in which the source node participates; a peer group field 412 for carrying a peer group leader value indicative of the peer group leader of the associated peer group; and a peer group leadership priority field (PGL priority field) 414 for carrying PGL value indicating the priority value assigned to the peer group leader indicated in the associated field 412. In an embodiment, the field subgroups 408 associated with peer groups of the nodal hierarchy list of the source node are transmitted in order beginning with the lowest level peer group in the nodal hierarchy list of the source node to the highest level peer group in the nodal hierarchy list of the source node. Note that the hierarchy level of each peer group is determined from the point of view of the node, which is a member of the groups.

FIG. 7C shows a block diagram illustrating a new peer discovery message at 420 in accordance with topology discovery, maintenance, and hierarchy building protocol operations of the present invention. The new peer discover message 420 is sent via unicast point to point methods to a destination node for the purpose of notifying the destination node that a new peer group member has been discovered. The message 420 is sent from any participating node in the network that discovers a new node that is a member of a particular peer group, and is sent to the peer group leader of the peer group for which a new peer group member has been discovered. The message 420 may be used to indicate that a plurality of new peer group members has been discovered.

The new peer discover message 420 carries a payload including: a DCS protocol version field 430; a message type field 432 for carrying a value indicating that the message 420 is a new peer discovery message; a group leader field 434 for carrying a group leader value indicating the group leader 206 (FIG. 5) as determined by the source node sending the message 420; a PGL priority field 436 carrying a value indicating the PGL priority of the group leader; a number of nodes field 438 indicating a number of newly discovered nodes; and a field group 440 including at least one node ID field 442 for carrying a node ID of a newly discovered peer member.

As time passes in the mobile communications network of the present invention, a new node may be discovered to belong to a previously existing peer group. The discovery occurs by comparing information associated with each node in the nodal hierarchy lists 280 (FIG. 6F) of neighboring nodes, the information being exchanged via neighborhood hello messages 350 (FIG. 7A) and peer group hello messages 380 (FIG. 7B) as described. When a new node is discovered, it may be one node joining a peer group with multiple nodes; it may be two lone nodes forming a embryonic peer group; or it may be two formerly disjointed peer groups each having multiple nodes merging together. When a node discovers one or more new nodes that belong to a same peer group via the neighbor discovery process, it sends a new peer discovery message 420 to all members of its current peer group.

The peer group leaders control the joining or merger of two peer groups. When a peer group leader receives a new peer discovery message, it sends a new peer discovery message 420 to the other peer group leader. The message includes a list of nodes in the peer group as it is operating now prior to the discovery of the new nodes. The other peer group leader would do the same. After this exchange, the two peer group leaders will have determined which one of them will be the new peer group leader in the new expanded peer group. The new peer group leader will control the pace and the process of the merging and will initiate and conduct a cache alignment process with the other peer group leader in accordance with the DCS protocol as further explained below. In the cache alignment process, the two peer group leaders exchange cache entries of the two groups, and feed the other group's cache entries to all the members in its group. As the cache alignment is in progress, conditions in the network may change that would result in either cache entry change or more drastically a logical node is dead. The cache alignment process allows a cache entry and/or a node to be withdrawn. When the cache alignment is done, each peer group leader will send the other one a list of its peer group members using the new peer discovery message 420 to signal the end of the process. Each peer group leader then sends a new peer discovery message 420 to all its peer members to instruct them to start operating as one cohesive group.

With formation of a peer group, a peer group leader is elected. The peer group leaders on one level can in turn form peer group on a next level. When a new peer group is formed on an upper level, the peer group leaders will update its nodal hierarchy list 280 (FIG. 6F) with the upper level peer group peer group leader and its peer group leader leadership priority. The peer group leaders will send the updated nodal hierarchy list to their perspective peer groups. The members in the peer group in turn update their nodal hierarchy lists and send it to the peer groups on the lower level. The process continues until it reaches the lowest level logical nodes.

While the updated peer group information is propagated down the hierarchy, the physical nodes where the logical nodes reside also update their nodal hierarchy lists 280 (FIG. 6F). This in turn will cause the nodal hierarchy list that is sent in each neighborhood hello message 350 (FIG. 7A) to change. As neighboring nodes examine updated nodal hierarchy lists, new peer adjacency can be discovered. New peer groups start to form. The process continues until the hierarchy is fully established, and becomes stabilized when no new change occurs.

Figure 8A:
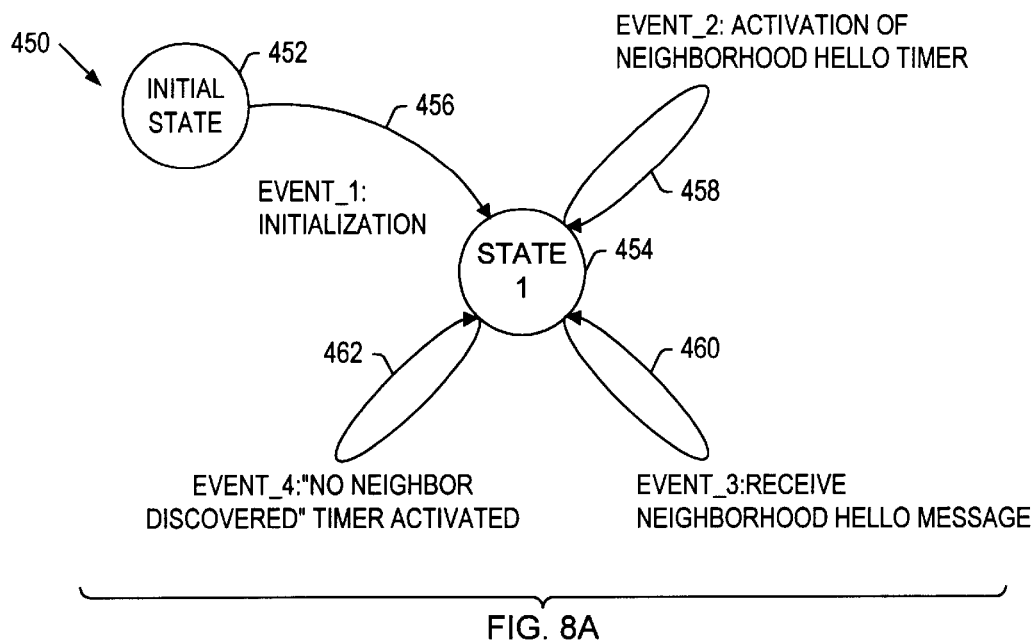
FIG. 8A is a generalized state diagram illustrating operation of a neighbor discovery state machine in accordance with the topology discovery, maintenance, and hierarchy building processes of the present invention.

FIG. 8A shows a generalized state diagram illustrating a neighbor discovery state machine at 450 in accordance with the hierarchy building process of the present invention the state machine 450 operating at each of the participating nodes 200 (FIG. 5) of the network. The state machine 450 operates in an initial state 452 which transitions to a first state 454 upon an initialization event 456 designated EVENT_1 wherein timers are initialized at the node. Upon activation of a neighbor hello timer which constitutes a second event designated EVENT_2, the state machine executes a second event process 458 as further explained below. Upon receiving a neighborhood hello message 350 (FIG. 7A), an event which is designated as EVENT_3, the neighborhood discovery state machine executes a third event process 460 as further explained below. Upon activation of a "no neighbor discovered" timer, the state machine 450 of the node executes a fourth event process 462 as further explained below.

Figure 8B:
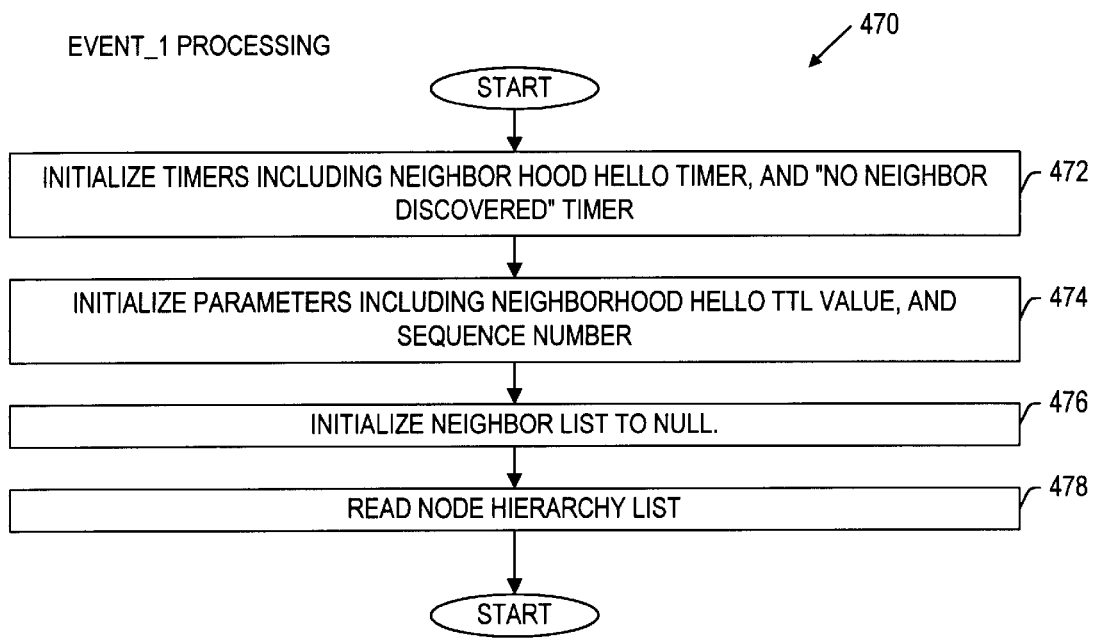
FIGS. 8B through 8E are flow diagrams illustrating various processes performed by the neighbor discovery state machine upon the occurrence of associated events.

FIG. 8B shows a flow diagram at 470 illustrating EVENT_1 processing of the state machine 450 (FIG. 4A) upon initialization of timers used in the neighbor discovery process. The process 470 begins with step 472 in which the node initializes timers including a neighborhood hello timer, and a "no neighbor discovered" timer. In step 474, the node initializes variables including the neighborhood hello TTL value, and a sequence number for sending neighborhood hello messages. In step 476, the node initializes its neighbor list 270 (FIG. 6E) to null. In step 478, the node reads the local nodal hierarchy list 280 (FIG. 6F) which is managed by the peer group hierarchy state machine as further explained below. Step 478 is optional.

Figure 8C:
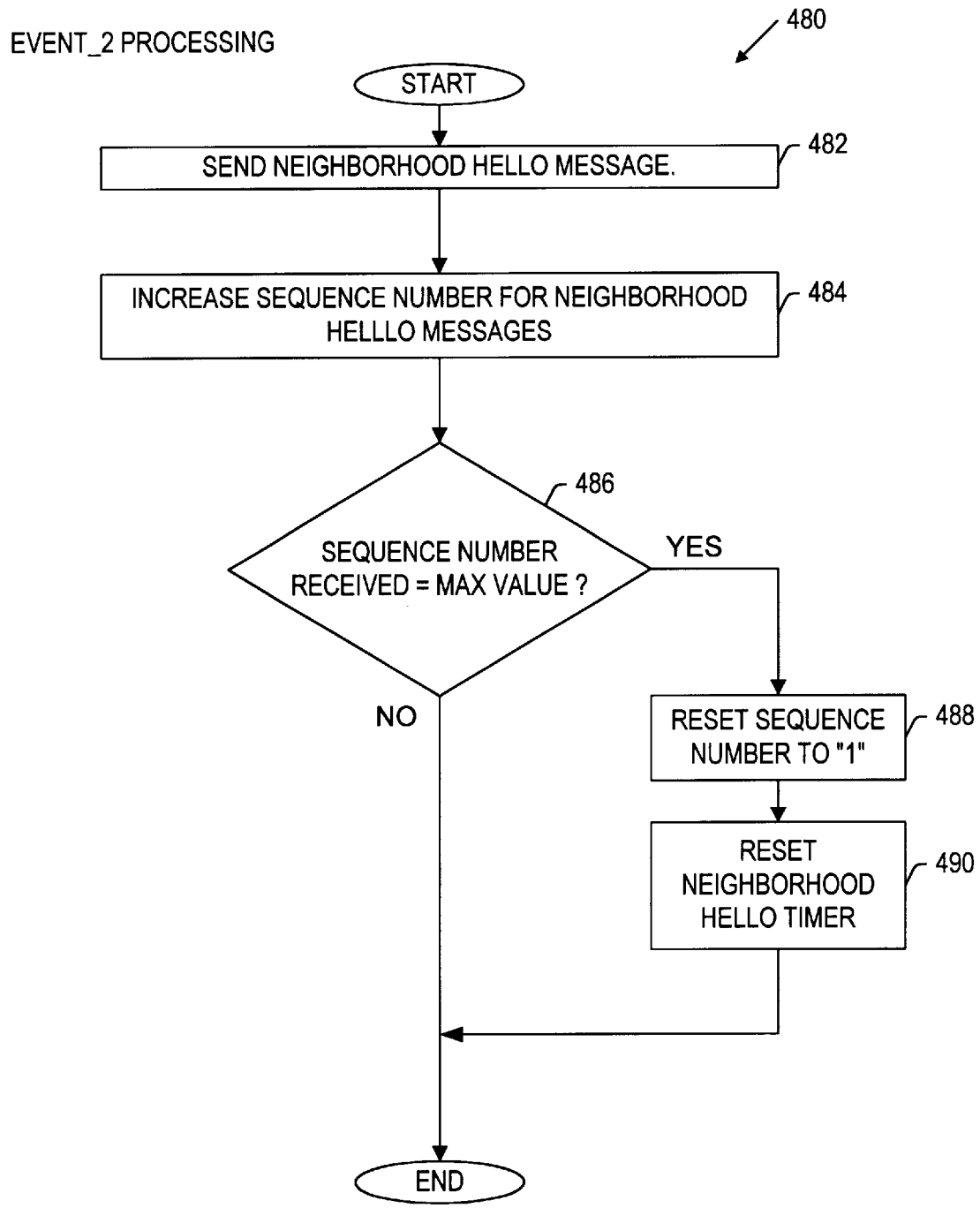

FIG. 8C shows a flow diagram illustrating EVENT_2 processing of the state machine 450 (FIG. A) which is executed in response to activation of the neighborhood hello timer of the node. The process 480 is repeated for each cycle of the neighborhood hello timer, and begins with step 482 in which the node sends information associated with each node in the neighborhood hello message 350 (FIG. 7A) 350 including the nodal hierarchy list 280 (FIG. 6F) carried in it's field sub group 370 (FIG. 7A). In step 484, the node increases its sequence number for neighborhood hello messages sent. In an embodiment, the sequence number is a 32-bit value. In an alternative embodiment, the sequence number could be a 2-bit value having values ranging between 1 and 65564.

From step 484, the process proceeds to 486 at which the node determines whether the sequence number has reached a maximum value, and if so, the process proceed to step 488 in which the node resets the sequence number to one, after which the process proceeds to step 490 in which the node resets the neighborhood hello timer, after which the process ends. Alternatively, if it is determined that 486 at the sequence number is not equal to the maximum value, the process ends without executing steps 488 and 490.

Figure 8D:
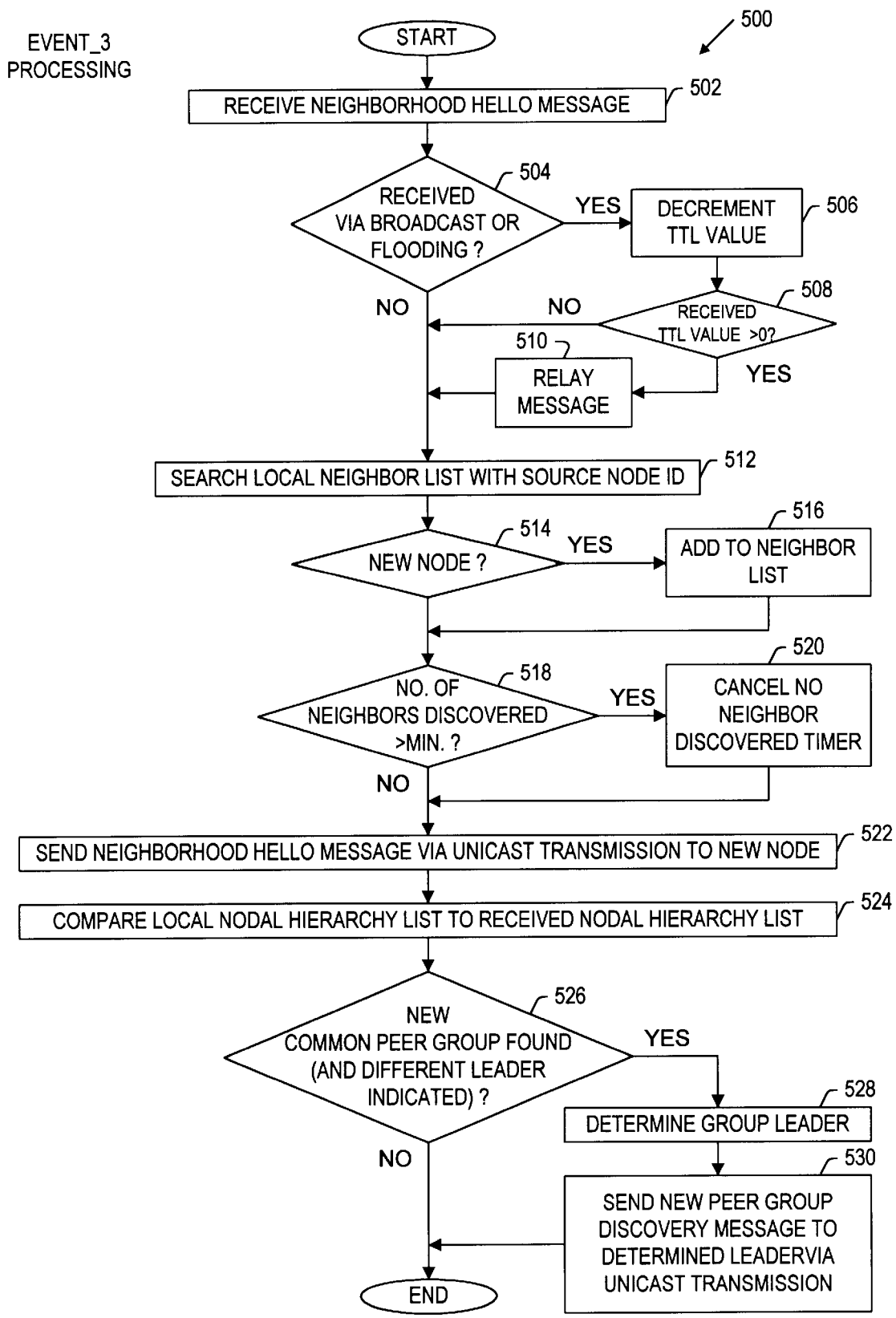

FIG. 8D shows a flow diagram illustrating EVENT_3 processing performed by the neighbor discovery state machine 450 (FIG. 8A) in response to the node receiving a neighborhood hello message. The process 500 begins with step 502 in which the node receives a neighborhood hello message 350 (FIG. 7A). From step 502, the process proceeds to 504 at which the node determines whether the received neighborhood hello message has been received via either broadcast or flooding methods. The determination at 504 is made by the node by reading the neighborhood hello message. If it is determined at 504 that the neighborhood hello message has been received via either broadcast or flooding methods, the process to step 506 in which the node decrements the TTL count value of the neighborhood hello message. From step 506, the process proceeds to 508 at which the node determines whether the received TTL count value of the received neighborhood hello message is greater than zero. If it is determined at 508 that the received TTL count value is greater than zero the process to step 510 in which the node relays the neighborhood hello message by sending the message via all links or ports except the link or port by which the message was received in step 502. Alternatively, if it is determined that 508 that the TTL count value of the received neighborhood hello message is not greater than zero, the process proceeds to step 512. Also, if it is determined that step 504 that the neighborhood hello message is received by a method other than broadcast or flooding, the process proceeds directly to step 512.

In step 512, the node, having received the neighborhood hello message, searches the local neighbor list 270 (FIG. 6E) using the source node ID of the neighborhood hello message received in step 502. In step 512, the node is determining whether the neighborhood hello message has been received from a node which is already known to be a neighbor of the local node, that is by determining whether the source node is indicated on the neighbor list. From step 512, the process proceeds to 514 in which the node determines whether the source node, that is sent the neighborhood hello message, is a new node, that is whether the source node is not found in the neighbor list 270 (FIG. 6E). If it is determined that 514 at the source node is a new node, the process proceeds to step 516 in which the node adds the node ID of the source node to the neighbor list 270 (FIG. 6E). Alternatively, if it is determined that 514 that the source node is not a new node, the process proceeds from 514 directly to 518.

At 518, the node determines whether the number of neighbors discovered is greater than a predetermined minimum number of nodes discovered. The predetermined minimum number of neighbors discovered should be a significant number. If it is determined at 518 that the number of neighbors discovered is greater than the predetermined minimum value, the process proceeds from 518 to step 520 in which the node cancels the "no neighbor discovered" timer, after which the process proceeds to step 522. Alternatively, if it is determined that 518 that the number of neighbors discovered is not greater than the predetermined minimum number, the process proceeds directly from 518 to step 522 in which the node sends a neighborhood hello message via unicast methods back to the new node from which the neighborhood hello message was received in step 502.

In step 524, the node compares the local nodal hierarchy list 280 (FIG. 6F) of the local node to the received nodal hierarchy list information which was carried by the fields sub group 370 (FIG. 7A) of the received neighborhood hello message. From step 524, the process proceeds to 526 at which the node determines whether a new common peer group has been discovered as a result of receiving the neighborhood hello message in step 502, and also determines whether a different peer group leader is indicated by contents of the group leader field 376 (FIG. 7A).

If it is determined at 526 that a new common peer group has been discovered, and that a different peer group leader is indicated in the received neighborhood hello message, the process proceeds to step 528 in which the node determines a group leader of the new common peer group in accordance with the same election algorithm which is executed at each node of the network. As mentioned above, step 528 includes comparing the PGL priorities of the two different leaders. From step 528, the process proceeds to step 530 in which the node sends a new peer group discovery message 420 (FIG. 7C) to the peer group leader determined in step 528 via unicast transmission methods.

Figure 8E:
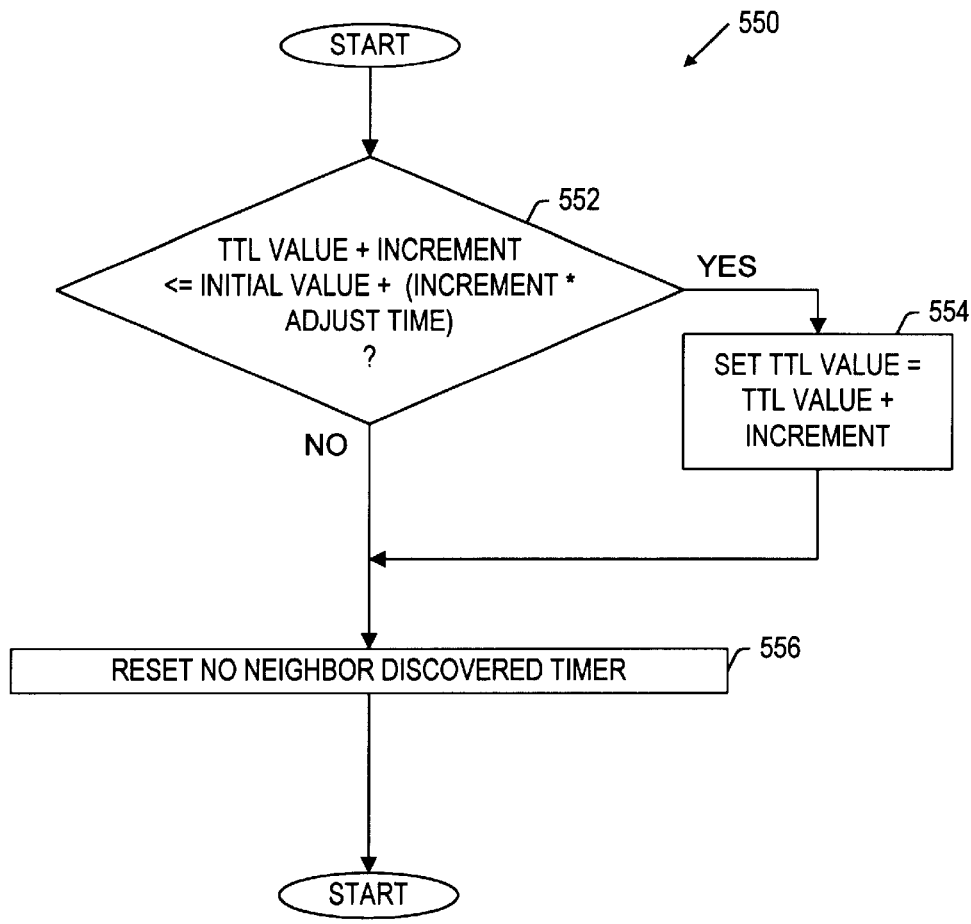

FIG. 8E shows a flow diagram illustrating EVENT_4 processing executed by the neighbor discovery state machine 450 (FIG. 8A) in response to expiration of the "no neighbor discovered" timer. The EVENT_4 processing begins with a determination at 552 wherein the node determines whether the sum of the TTL value and the increment value is less than or equal to the sum of the initial value plus the product of the increment and the adjusted time as expressed in relationship (1)m below:

$$TTL\ value+increment<=initial\ value+(increment * adjust\ time) \quad (1)$$

If the determination at 552 is true, the process proceeds to step 554 in which the node sets the TTL value equal to the TTL count value plus a predetermined incremental value. Alternatively, if the determination at 552 is not true, the process proceeds directly to step 556 in which the node resets the "no neighbor discovered" timer, after which the process ends.

One example of an application for the DCS protocol of the present invention is to support the location update protocol for managing the distributed cache of the mobile communication network 100 (FIG. 3A) in which the cache data comprises network subscriber profile information as explained above. However, in accordance with the present invention, the DCS protocol maybe used for managing a distributed cache in any type of computer network wherein the cache data comprises any other type of information. Each of the below described DCS messages as used for managing a distributed cache, and is sent and received by participating nodes in a network (e.g., the base stations 114 of the network 100 of FIG. 3A).

Figure 9A:
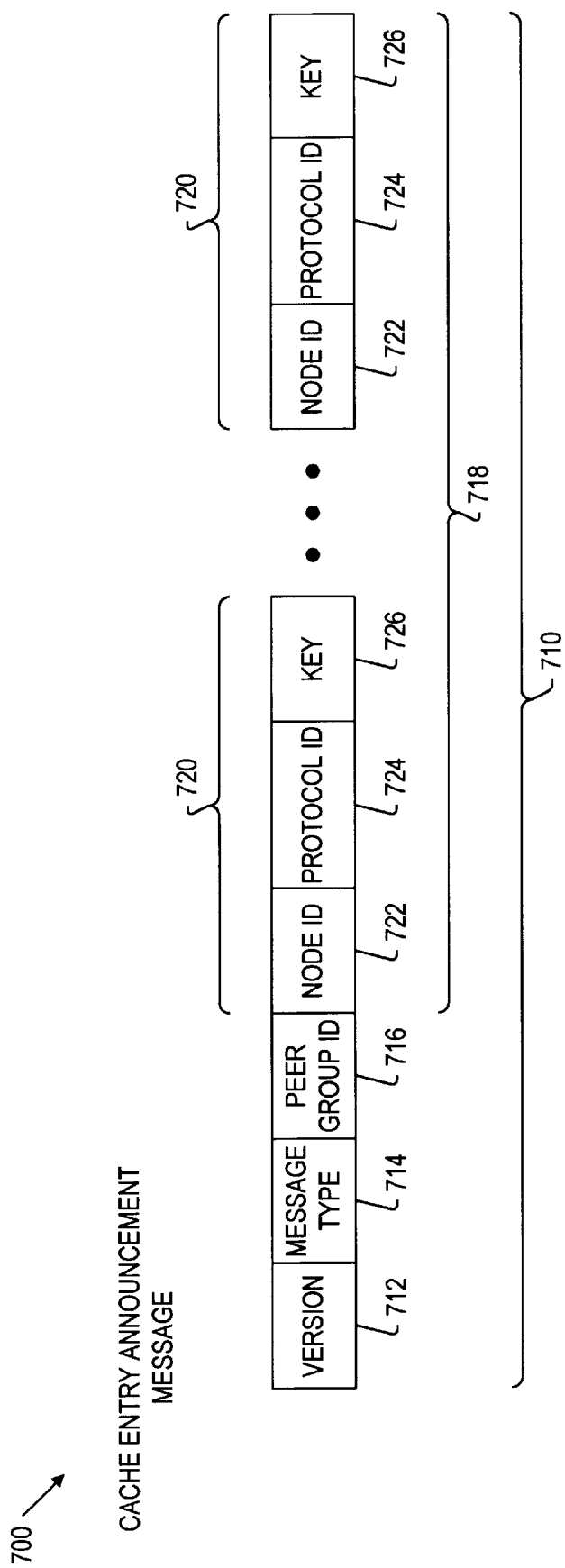

FIG. 9A shows a block diagram generally illustrating the data structure of a cache entry announcement message at 700 in accordance with the DCS protocol. As further explained below, the cache entry announcement message 700 is used in the location update protocol to announce that a new cache entry is located at one of the base stations 114 (FIG. 3A) such as when a new mobile host is authenticated within the coverage area 118 (FIG. 3A) associated with the base station, or when ownership of a particular cache entry changes as a result of a hand off procedure as described above. The message 700 is propagated from a corresponding source node, such as one of the base stations 114, (FIG. 3A) to other participating nodes in the network via the established nodal hierarchy as explained above in accordance with either flooding or multi-cast techniques. The message 700 includes: an address which may include a multi-cast address of a group of nodes in a hierarchy established within the network 100 (FIG. 3A), or may include an IP broadcast address.

The pay-load 710 of the message includes: a version field 712 for carrying a DCS protocol version value indicating the version of the DCS protocol being used; a message type field 714 for carrying a value indicating that the message 700 is a cache entry announcement message; a peer group ID value 716 indicative of a group of nodes in the established hierarchy in the network 100 (FIG. 3A); and at least one tuple or fields 720 carrying information identifying an associated cache entry. As used in on e embodiment of the location update protocol of the present invention, each of the tuples 720 includes: a node ID field 722 for carrying a node IP value (e.g., an IP address) of an associated one of the base stations 114 (FIG. 3A) where an associated cache entry resides; a protocol ID field 724 for carrying a protocol ID value for indicating the type of application protocol supported by the message (note that the DCS protocol may be used to support several application protocols that are concurrently active within the network 100 of FIG. 3A); and a key field 726 for carrying an associated profile subscriber key value indicating an associated cache entry that is being announced to be residing at the indicated base station. As mentioned, each of the subscriber profile key values is a concatenated value including a telephone number link layer ID associated with the subscriber, and the link layer ID of the associated mobile host 120 (FIG. 3A).

Figure 9B:
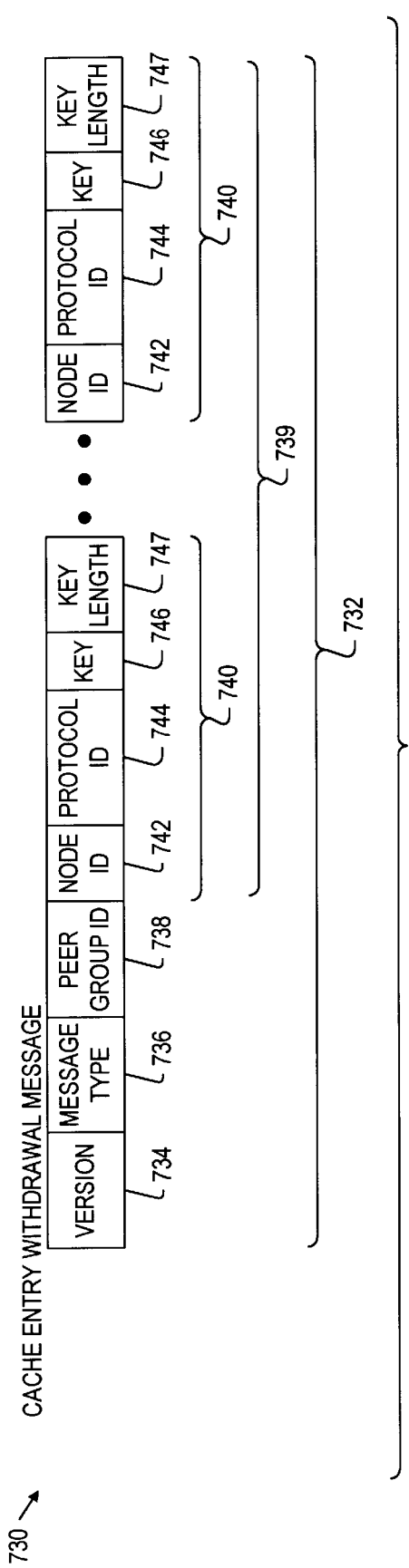

FIG. 9B shows a block diagram generally illustrating the data structure of a cache entry withdrawal message at 730 that is used by each of the base stations 114 (FIG. 3A) in accordance with the location update protocol as further explained below, to announce that one or more specified cache entries, and associated subscriber profiles, have been deleted at the base station, or to announce that ownership of a cache entry has been transferred from a local base station to another base station in the network. Each cache entry withdrawal message 730 is propagated from a corresponding source of the base stations 114 to other participating nodes in the network 100 (FIG. 3A) via the established nodal hierarchy in accordance with either flooding or multi-cast methods. In the depicted embodiment, the cache entry withdrawal message 730 includes a payload 732 including: a DCS protocol version field 734; a message type field 736 for carrying a value indicating that the message 730 is a cache entry withdrawal message; a peer group ID field 738 for carrying a peer group ID value indicating a peer group of which the source node is a member; and a field group 739 for carrying information specifying at least one cache entry having an associated subscriber profile which is being withdrawn from ownership and deleted from the local subscriber list 150 (FIG. 4A) at the source node.

The field group 739 includes a plurality of tuples 740 each carrying information for specifying an associated cache entry that is being announced to be withdrawn from ownership at the source node. Each of the tuples 740 includes: a node ID field 742 carrying a node ID (e.g., an IP address) of the base station at which a corresponding cache entry is being withdrawn; a protocol ID value 744 for carrying the protocol ID as described above; a key field 746 for carrying a subscriber profile key value indicating an associated subscriber profile; and a key length field 747 for carrying a key length value indicating the length in bits of the subscriber profile key. The key length field 747 provides flexibility in the DCS protocol. As an example, a 32-bit value may be used to represent a 10-digit telephone number, although mapping will be required. Alternatively, a larger number of bits may be used to represent a 10-digit telephone number without requiring mapping. In order to make the DCS protocol flexible, the key length allows for using keys of different lengths.

Figure 9C:
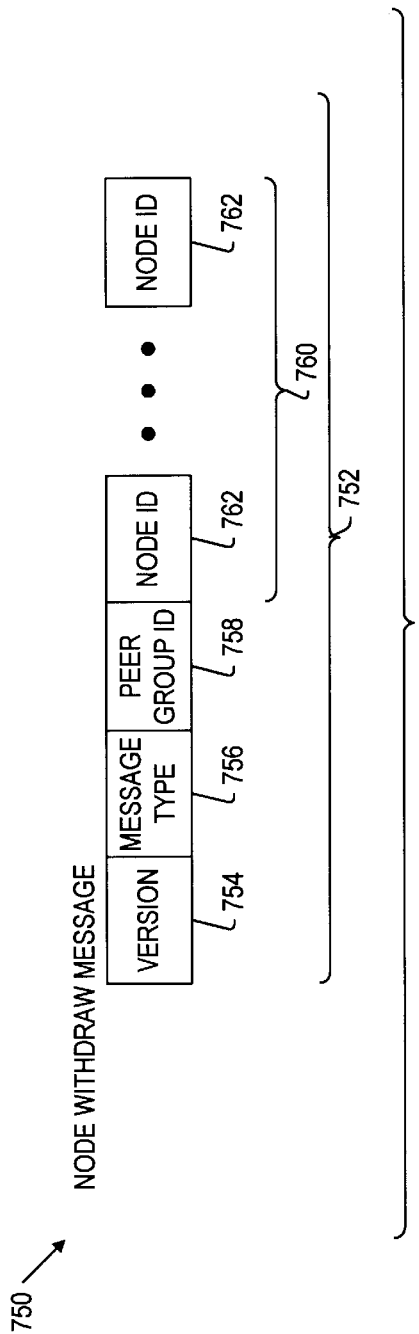

FIG. 9C shows a block diagram generally illustrating the data structure of a node withdraw message at 750 in accordance with the DCS protocol. The node withdraw message 750 is used to maintain the data integrity of the distributed cache of the network 100 (FIG. 3A) when a particular node in the network is not operating, or when communication fails between a particular node and other nodes of the network. A communication failure between a particular node and other nodes of the network may be detected by failure to receive a peer group hello message 380 (FIG. 7B) after a predetermined period of time. As an example, the peer group leader 206 (FIG. 5) of a peer group 204 (FIG. 5) may determine that a particular peer member of the group is "dead" after a period of time during which no peer group hello message is received from the particular member. In this case, the integrity of data which originated at the dead node, and the integrity of data which was relayed via the dead node cannot be relied upon. Therefore, the peer group leader will read its global subscriber list 170 (FIG. 4C) to determine all cache entries 172 (FIG. 4C) which are stored at, and which must be relayed by the dead node. This function is achieved by reading the contents of the base station location information field 166 (FIG. 4C) and the contents of the connectivity information field 174 (FIG. 4C) of the global subscriber list for each of the cache entries. After having determined a list of cache entries associated with the dead node, the peer group leader generates and transmits a node withdraw message 750 to all members of the peer group and also to fellow members of any upper level peer group. The nodes withdraw message, which carries the node ID of the dead node, is relayed by logical node among the peers of the dead node, and is also relayed by the logical nodes at upper and lower levels of the hierarchy when applicable. In this manner, the node withdraw message is propagated throughout the hierarchy.

The node withdraw message 750 may be transmitted via broadcast or flooding, and carries a payload including: a DCS protocol version field 754; a message type field carrying a value indicating that the message 750 is a node withdraw message; a peer group ID field 758 for carrying a peer group ID value indicating a peer group to which one or more associated dead nodes are members; and a field subgroup 760 carrying information indicating a list of nodes which are withdrawn, or considered to be "dead". The field subgroup 760 includes at least one node ID field 762 carrying an associated node ID value indicating a withdrawn or dead node of the peer group indicated by the contents of the peer group ID field 758.

Upon receiving a node withdraw message 750, each node of the network 100 (FIG. 5) searches its global subscriber list 170 (FIG. 4C) to determine cache entries 172 (FIG. 4C) which are stored at, or which must be relayed by dead node(s) indicated in the node ID field(s) 762 of the node withdraw message. After having made this determination, the receiving node deletes all cache entries 172 (FIG. 4C) of the global subscriber list for which the dead node had been relied upon for data integrity.

As mentioned above, when one of the mobile hosts 120 (FIG. 3A) crosses the boundary between a pair of the coverage areas 118 (FIG. 3A) associated with base stations 114, a hand-off procedure is performed by the old base station from which the mobile host has departed to the new base station associated with the new area into which the mobile host has entered. In different types of hand-off procedures, either the receiving side, that is the new base station, or the hand-off side, that is the old base station, may initiate the hand-off procedure which includes transferring the subscriber profile associated with the host from the old base station to the new base station. Depending upon which type of hand-off procedure initiation scheme is used, different messages of the DCS protocol may be used to implement the hand-off procedure.

FIG. 9D shows a generalized block diagram illustrating the data structure of a cache entry transfer request message at 770. For purposes of supporting the location update protocol of the present invention, the cache entry transfer request message 770 of the DCS protocol may be used in performing the type of hand-off procedure wherein the receiving side, that is the new base station, initiates a transfer of an associated subscriber profile. In one embodiment, the cache entry transfer request message 770 is transmitted from the new base station to the old base station in accordance with a point-to-point unicast method. In the depicted embodiment, the cache entry transfer request message 770 carries a payload 772 including: a DCS protocol version field 774; a message type field 776 for carrying a value indicating that the message 770 is a cache entry transfer request message; and a plurality of tuple field groups 777 each identifying a cache entry, and an associated subscriber profile, for which transfer is being requested. Each of the tuple field groups 777 includes: a node ID field 778 for carrying node ID (e.g., IP address) of the base station requesting transfer of the indicated cache entry; a protocol ID field 780 for carrying the protocol ID as explained above; and a profile subscriber key field 782 for carrying an associated profile subscriber key value uniquely identifying an associated cache entry for which transfer is being requested. The cache entry transfer request message 770 is also used in distributed cache alignment processes as further explained below. In an embodiment, the key field 782 further includes a uniqueness flag indicating whether the key is locally or globally unique, and a key length value indicating the length of the key in bits.

FIG. 9E shows a block diagram generally illustrating the data structure of a cache entry transfer message at 790 in accordance with the DCS protocol. For purposes of supporting the location update protocol of the present invention, the cache entry transfer message 790 is used in performing hand-off procedures wherein either the receiving side or hand-off side initiates a transfer of an associated subscriber profile. The cache entry transfer message 790 is also used in cache alignment processes as further explained below. The message 790 is transmitted from a source node to a destination node via point-to-point unicast techniques, and carries a payload including: a DCS protocol version field 794; a message type field 796 for carrying a value indicating that the message 790 is a cache entry transfer message; and at least one field group 797 for carrying information including actual subscriber profile data that is being transferred from one participating node to another.

Each of the field groups 797 includes: a node ID field 798 for carrying the node ID of the base station transferring a specific cache entry; a protocol ID field 800 for carrying the protocol ID value as explained above; a profile subscriber key field 802 for carrying an associated profile subscriber key value uniquely identifying an associated cache entry being transferred; a cache length field 804 indicating a length in bytes of the actual profile data being transferred; and a cache entry field 806 for carrying the profile data indicated by the subscriber profile key value carried in the key field 802. The actual profile data carried by the cache entry field 806 includes a version number.

When a cache entry is transferred via a cache entry announcement message, the receiving node becomes the owner of the transferred cache entry. When the key value associated with the transferred cache entry is only locally unique, a new key value must be generated by the receiving node. The receiving node must announce the cache entry transfer, and the new ownership, to the hierarchy via a cache entry announcement message 700 (FIG. 9A). Note that a cache entry withdraw message 730 (FIG. 9B) is usually transmitted following a cache entry transfer message 790 to indicate that ownership of the transferred cache entry has been changed.

FIG. 9F shows a block diagram generally illustrating the data structure of a cache entry copy request message at 810 in accordance with the DCS protocol. The cache entry copy request message 810 is used in the supporting location update protocol when a copy of a cache entry is required to be transferred from one node in the network to another, without any transfer of ownership of the cache entry. For example, in a call processing operation, a first one of the base stations 114 (FIG. 3A) initiating a call requests the current subscriber profile of a called party to determine if the called party is currently active, or on call (e.g., busy, out of the area, or inactive). The cache entry copy request message 810 is transferred from the base station initiating the call to an owner one of the base stations 114 (FIG. 3A) associated with the called party via point-to-point unicast methods. A cache entry copy message carrying the requested subscriber profile, as described below, is returned by the owner base station to the requesting base station.

The cache entry copy request message 810 carries a Payload 812 including: a DCS protocol version field 814; a message type field 816 for carrying a value indicating that the message 810 is a cache entry copy request message; and a plurality of tuple field groups 817 each having a node ID field 818 for carrying the IP address of the requesting base station, protocol ID field 820, and a subscriber profile key field 822 for carrying a subscriber profile key value indicating a cache entry for which a copy is being requested.

FIG. 9G shows a block diagram generally illustrating the field structure of a cache entry copy message at 830 in accordance with the DCS protocol. The cache entry copy message 830 is used in supporting the location update protocol to transfer copies of cache entries including subscriber profile data from one node in the network to another, without any transfer of ownership of the cache entry. As an example, the message 830 may be used in the supporting location update protocol for transmitting copies of subscriber profiles from one of the base stations 114 (FIG. 3A) to its associated mirror base stations as further explained below. As another example, the message 830 may be used in call processing operations to transmit a copy of a subscriber profile from an owner base station associated with a called party to a requesting base station associated with a calling party. The cache entry copy message 830 is transmitted via point-to-point unicast techniques.

In the depicted embodiment, the cache entry copy message 830 carries a Payload including: a DCS protocol version field 834; a message type field 836 for carrying a value indicating that the message 830 is a cache entry copy message; and at least one field sub-group 837. Each of the field sub-groups 837 includes: a node ID field 838 for carrying the node ID (e.g., IP address) of the transferring node, or base station; a protocol ID field 840 as described above; and a subscriber profile key field 842 for carrying a subscriber profile key value associated with a subscriber profile of which a copy is being transferred; a cache length field 844 for carrying a value indicative of the length in bytes of the associated subscriber profile being copied; and a cache entry field 846 for carrying the actual subscriber profile data that is being copied.

Figure 9H:
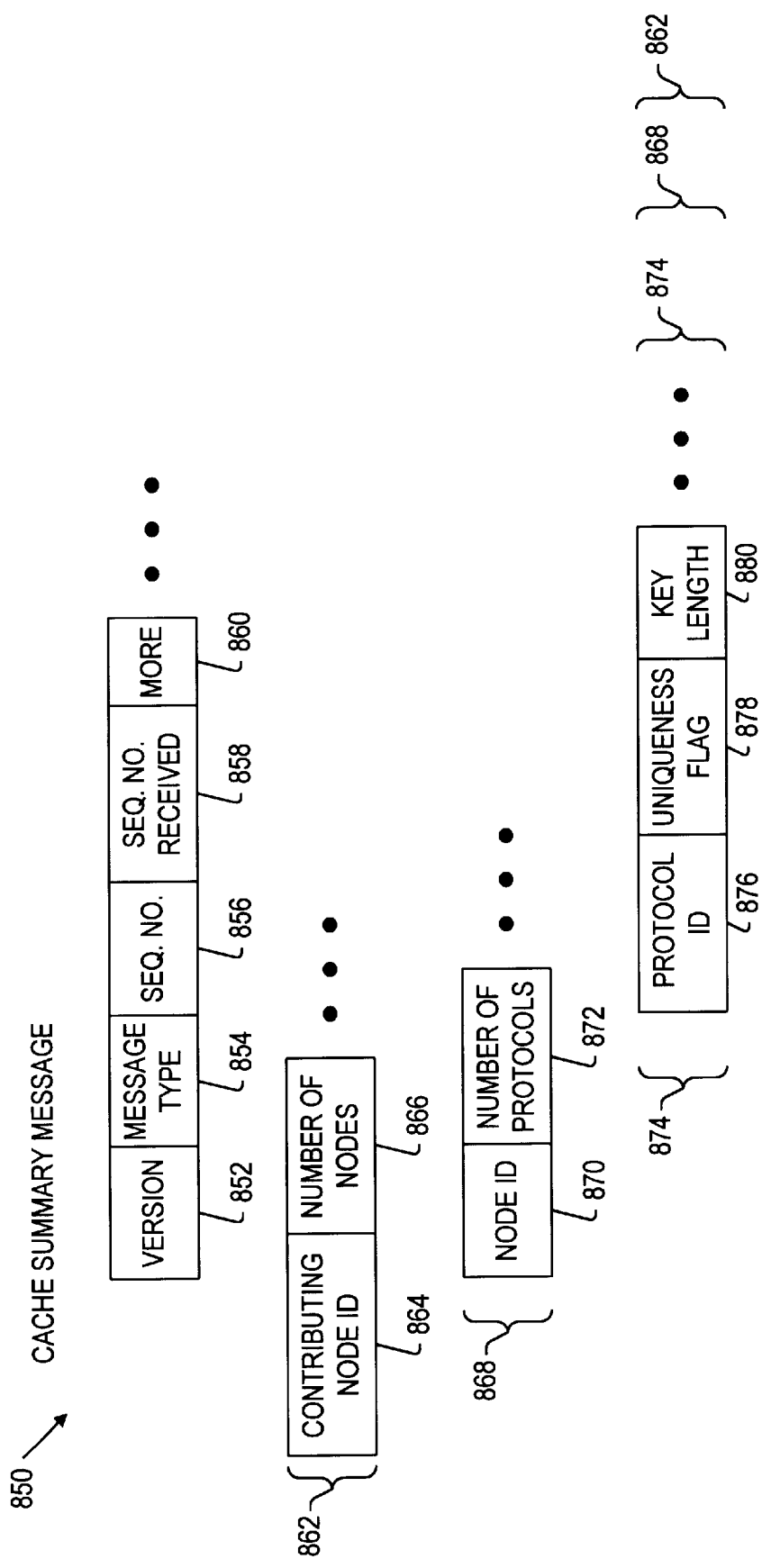

FIG. 9H shows a block diagram generally illustrating the field structure of a cache summary message at 850 used in accordance with the DCS protocol for aligning or synchronizing locally stored caches stored at selected nodes of the network 100 (FIG. 3A). The cache summary message 850 may be used to initiate cache alignment when two peer groups 204 (FIG. 5) of nodes in the hierarchy established in the network 100 (FIG. 5A) merge to become one peer group. The cache summary message 850 may also be used to initiate a cache alignment process in the case where one node in the network joins an existing peer group (e.g., a peer group member has been discovered via a neighborhood discovery process). The purpose of the cache summary message 850 is to initiate a cache alignment process between nodes in the network for the purpose of updating the global subscriber lists 170 (FIG. 4C) at the associated nodes of the network.

When two previously isolated peer groups 204 (FIG. 5) become aware of each other, the peer group leaders 206 (FIG. 5) of the two groups initiate a cache alignment process in order to merge. This gives the process the control it needs. To keep the exchange in an orderly fashion, at any one given time, no more than one packet, cache summary message 850 can be in transit between the two peer group leaders. The peer group leader having the higher leadership priority, or higher node ID, controls the pace of the packet exchange. Each side will use a "more" bit to indicate whether it has more packets to send. After a first packet has been exchanged each subsequent packet also serves as an acknowledgement of the receipt of the previous packet. The first stage of the cache alignment includes exchanging a summary of the locally stored cache on both sides. When either side runs out of summaries before the other side id finished, the side which has run out will keep sending summary messages with incrementing sequence numbers, a turned off more bit, and no actual summary. As the two peer group leaders are exchanging the cache summaries, the peer group leaders will also relay the summary packets to their respective peer group members. The peer group members will use a Cache Summary packet without a summary body to acknowledge the summary packet to ensure a reliable propagation of the cache summaries among all peer group members. When one or more new peer(s) is discovered before an on-going cache alignment is finished, the new alignment process is held off until the on-going process is done.

The cache summary message 850 includes a Payload carrying: a DCS protocol version field 852; a message type field 854 for carrying a value indicating that the message 850 is a cache summary message; a sequence number field 856 for carrying a sequence value indicating the sequential number of the message if the message is sent as one of a series of cache summary messages to another node which is being aligned or synchronized with the source node; a "sequence number received" field 858 for carrying a value indicative of a number of cache summary messages received from the destination node with which the source node is being aligned, the field 858 providing acknowledgement of receipt of previously received cache summary messages; a "more messages" field 860 for carrying a value indicating that additional messages follow in the series; and at least one field sub-group 862.

Each of the field sub-groups 862 includes: a contributing node ID field 864 for carrying connecting information associated with specified cache entries, such as an IP address of a contributing node from which the source node originally received information associated with specified cache entries; a number of nodes field 866; and at least one field sub-group 868.

Note that no subscriber profile keys are exchanged in the cache summary message 850. The purpose of the cache summary message 850 is to initiate a cache alignment process and provide each of the participating nodes with basic structure information regarding the cache of the other node. For the case in which two peer groups of the nodal hierarchy merge to become one peer group, the cache summary message is sent from the leader of a first peer group to the leader of a second peer group. In the case wherein the cache summary message is used for aligning caches, such as where a new node joins an existing peer group, cache summary messages are sent to and from the new node and also to and from the leader of the existing peer group. So, the new node and the leader of the existing peer group exchange a series of cache summary messages.

In response to a cache summary message, each node of the network creates data structures describing the cache and prepares for receiving real data including subscriber profile keys which follow. Note that it may be necessary to send more than one cache summary message because the number of cache entries may be very large. Therefore the "more field" 560 is used to indicate that additional cache summary messages 550 carrying additional summary information are forthcoming.

Each of the field sub-groups 862 includes: a contributing node ID field 864 for carrying a contributing node ID value indicating a node relied upon for integrity of the cache entry as mentioned above; a number of nodes field 866 for carrying a value indicative of the number of nodes in the merging peer group; and at least one field sub-group 868. Each of the field sub-groups 868 includes: a node ID field 870 for carrying a node ID value of an associated node in the peer group; a number of protocols field 872 for carrying a value indicative of a "number of application" protocols being supported by the DCS protocol (e.g., the location update protocol and a mobility management protocol in a mobile communications network); and at least one field sub-group 874.

Each of the field sub-groups 874 includes: a protocol ID field 876; a uniqueness flag field 878 for carrying a value indicating whether a key used to identify an associated cache entry is locally unique or globally unique; and a key length field 880 for carrying a key length value indicating a length in bytes of the associated key. A key is globally unique if it is operative to identify a cache entry at any participating node in the network. Conversely, a key is locally unique if it is only operative to identify a specific cache entry when used along with a node ID. The uniqueness flag field 878 provides flexibility in the DCS protocol.

Figure 9I:
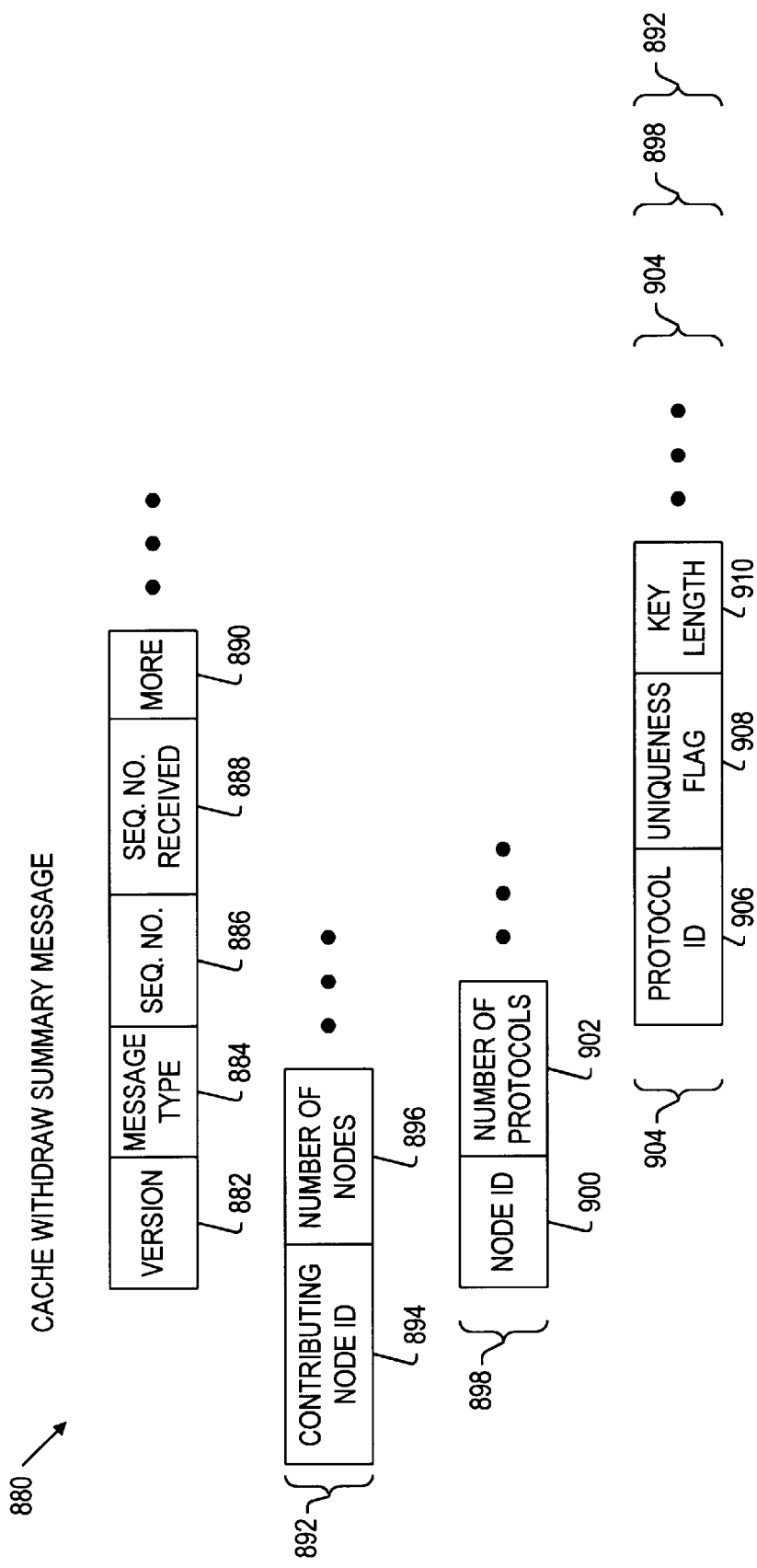

FIG. 9I shows a block diagram illustrating a cache withdraw summary message at 880. The cache withdraw summary message 880 is very similar to the cache summary message 850, (FIG. 9H). As two peer group leaders are exchanging cache summary messages 850, (FIG. 9H) a logical node in the hierarchy can become "dead". The cache withdraw summary message 880 may be used to withdraw the cache of the node associated with the dead logical node from the cache summary exchange. The cache summary message 850 (FIG. 9H) and cache withdraw summary message 880 share the same sequence space, that is they may be mixed together in any order under control of the peer group leaders controlling the cache alignment process.

The cache withdraw summary message 880 includes a Payload including: a DCS protocol version field 882; a message type field 884 for carrying a value indicating that the message 880 is a cache withdraw summary message; a sequence number field 886 for carrying a sequence number for messages exchanged during the cache alignment process as mentioned above (note that the message 880 shares the same sequence space as the cache summary message 850 of FIG. 9H); a sequence number received field 888 for carrying a value in sequence with the sequence number received value of previous cache summary messages; a more field 890 for carrying a value indicating whether or not there are more messages following; and at least one field sub-group 892.

Each of the field sub-groups 892 includes: a contributing node ID field 894 for carrying connectivity information associated with a corresponding cache entry; a number of nodes field 896; and at least one field sub-group 898. Each of the field sub-groups 898 includes: a node ID field 900 for carrying a node ID value of an associated node of the peer group; a number of protocols field 902 as described above; and at least one field sub-group 904. Each of the field sub-groups 904 includes: a protocol ID field 906 similar to those explained above; a uniqueness flag 908 for carrying a uniqueness value associated with a corresponding subscriber key value; and a key length field 910 for carrying a value indicating the length in bytes of the associated key value.

Figure 9J:
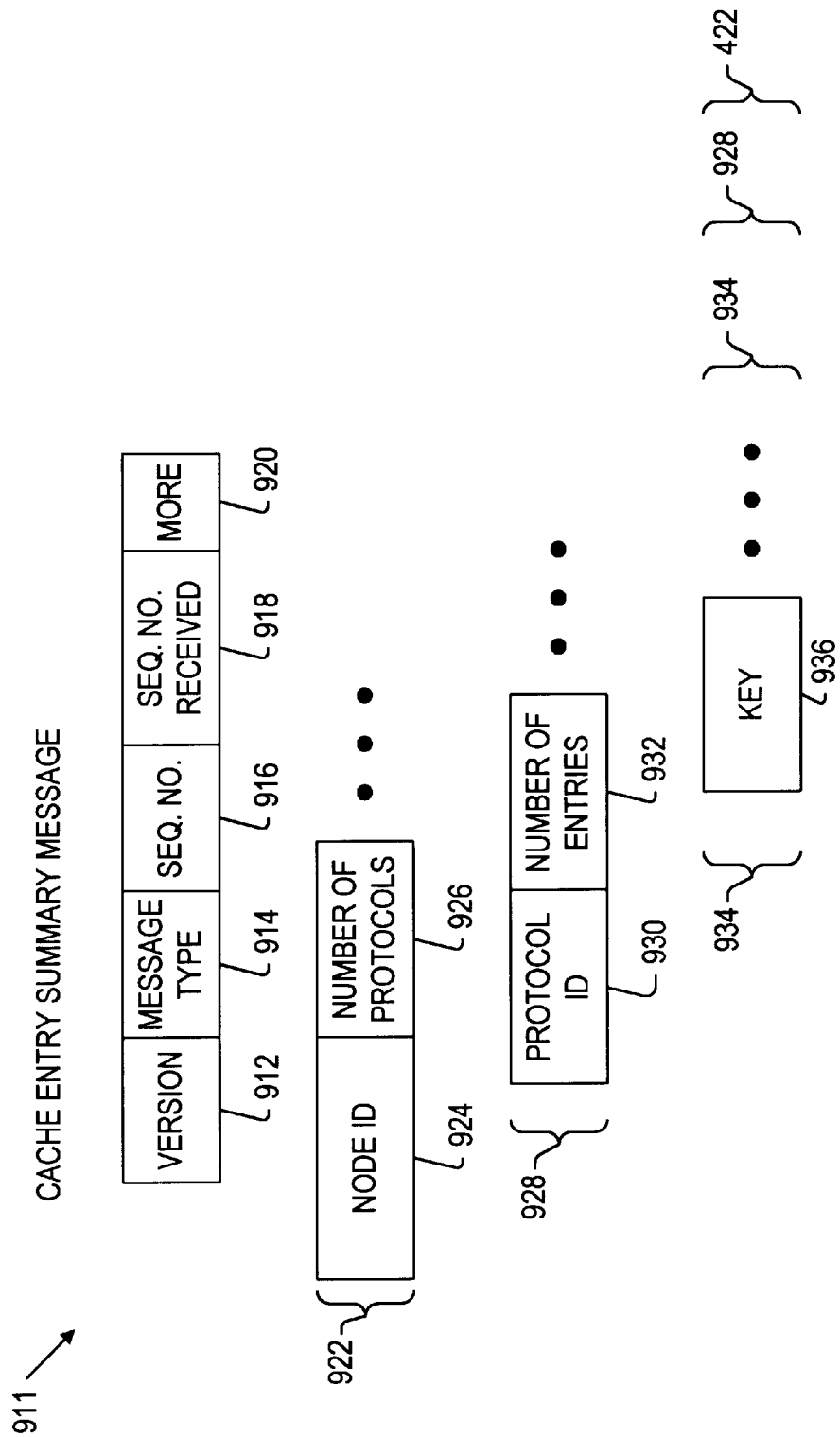

FIG. 9J shows a block diagram generally illustrating the data structure of a cache entry summary message at 911. Exchange of cache entry summary messages 911 follow exchange of the cache summary messages 850 (FIG. 9H). The cache summary message 911 actually carries the subscriber profile key values to be exchanged as further described below. The cache entry summary message 911 includes a Payload including: a DCS protocol version field 912; a message type field 914 for carrying a value indicating that the message 911 is a cache entry summary message; a sequence number field 916 for carrying a sequence number; a sequence number received field 918; a more field 920 for indicating whether additional messages 911 follow; and at least one field sub-group 922. Each of the field sub-groups 922 includes: a node ID field 924; a number of protocols field 926; and at least one field sub-group 928. Each of the field sub-groups 928 includes: a protocol ID field 930; a number of entries field 932; and at least one key field sub-group 934 having at least one key field 936.

When either node participating in the cache alignment process runs out of summaries before the other side is finished, providing a summary of cache entries stored at the source node, the node which has run out will keep sending cache entry summary messages with incrementing sequence numbers, a turned off more bit but with no actual summary. As the two peer group leaders are exchanging the cache entry summaries, the peer group leaders will also relay the summary packets to their peer group members in the same fashion as for relaying the Cache Summary messages 850 (FIG. 9H). When a new cache entry is received/generated at either side while the alignment process is on going, the new cache entry is inserted into or appended to the summary stream. The summary packet does not maintain any order. At the end of cache alignment process, the peer group leaders will send New Peer Discovery messages 420 (FIG. 7C) to their respective peer group members to inform them to start communicating in the new peer group.

Figure 9K:
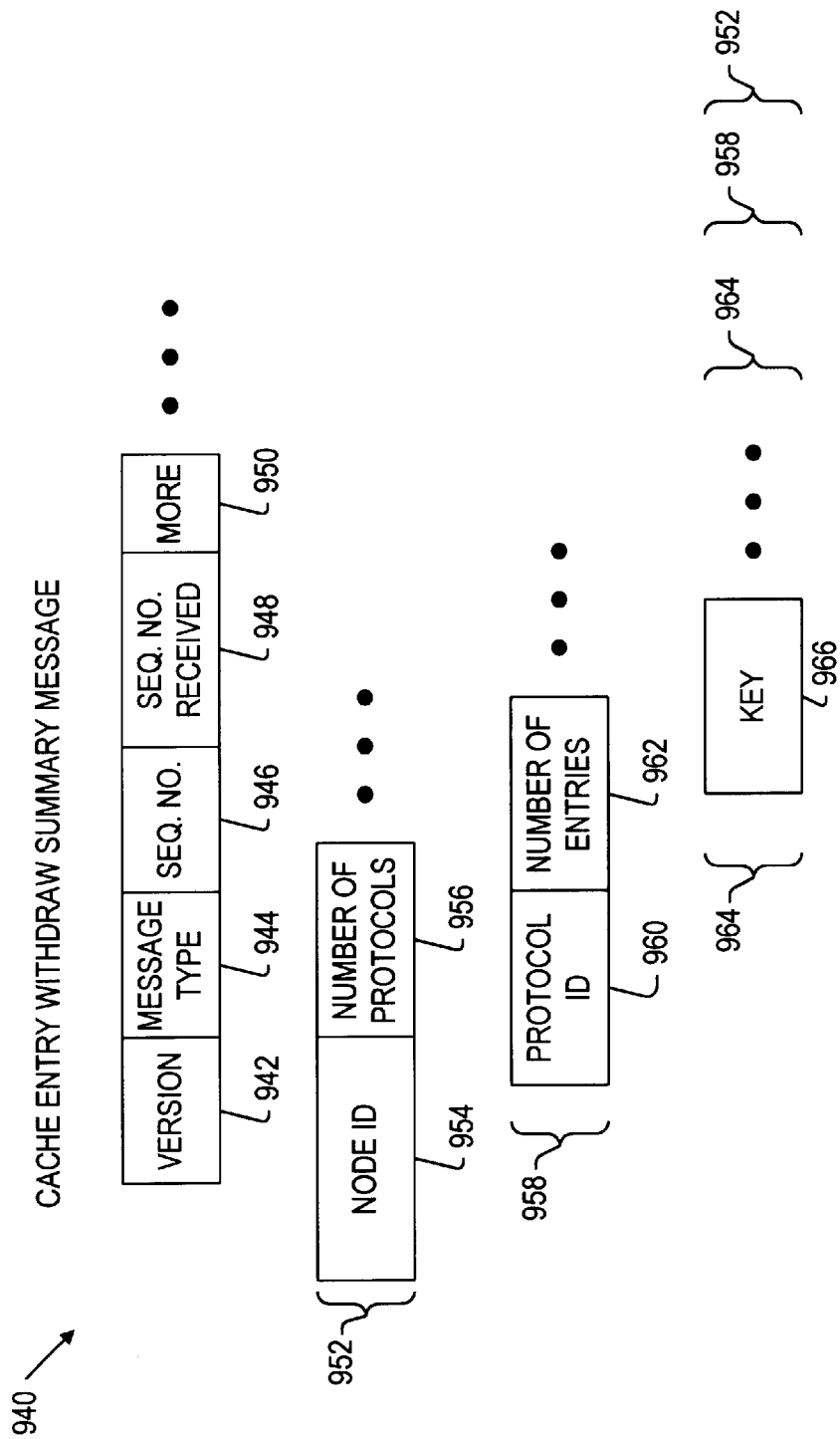

FIG. 9K shows a block diagram illustrating the data structure of a cache entry withdraw summary message at 940 used in the DCS protocol. The message 940 carries a Payload including: a version field 942; a message type field 944; a sequence number field 946; a sequence number received field 948; a more field 950; and at least one field sub-group 952. Each of the field sub-groups 952 includes: a node ID field 954; a number of protocols field 956; and at least field sub-group 958. Each of the field sub-groups 958 includes: a protocol ID field 960; a number of entries field 962; and at least on field group 646. Each of the field groups 964 includes at least one key field 966 for carrying an associated subscriber key value.

The cache entry withdraw summary message 940 is similar to the Cache Withdraw Summary message 880 (FIG. 9I), and is used to withdraw a cache entry summary that has already been exchanged due to changes that have occurred in the network. It shares the same sequence number space with cache entry summary. They can be mixed together in any fashion deemed fit by the sender. Before the cache alignment process finishes, if necessary, both cache summary and cache entry summary exchange can be restarted.

As mentioned, in one embodiment of the present invention, the services of the above described DCS protocol messages may be used to support the location update protocol of the present invention for managing the distributed cache of the mobile communications network 100 (FIG. 3A). As described with reference to flow diagrams below, the DCS protocol messages are used to transfer and copy subscriber profiles between base stations of the network, and also to announce the current location, or ownership, of subscriber profiles in the network.

Figure 10A:
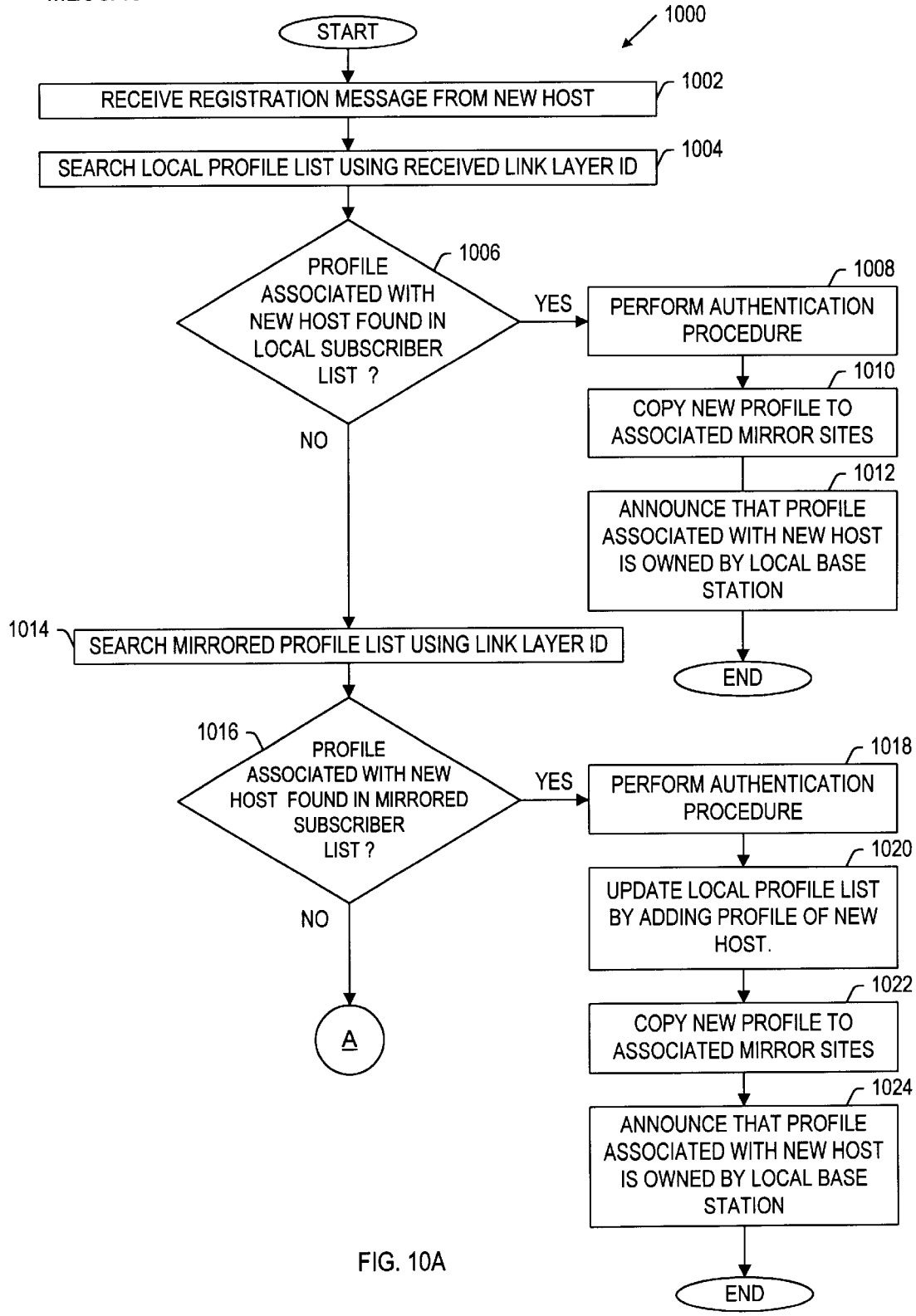
FIGS. 10A through 10D are flow diagrams generally illustrating a location update process in accordance with the present invention.

FIG. 10A shows a flow diagram illustrating a location update sub-process at 1000, the sub-process 1000 being performed by one of the base stations 114 (FIG. 3A) in response to receiving a registration message from a mobile host 120. In one embodiment, the sub-process at 1000 is implemented as software instructions executed by the base station computer system 130 (FIG. 3B). The sub-process 1000 begins with step 1002 in which the base station receives a registration message from a new one of the hosts 120 (FIG. 3A) that has been activated within the base station's associated coverage area 118 (FIG. 3A), the registration message including a link layer identification (ID) value. In one embodiment, the link layer identifier is a manufacturer ID uniquely identifying the new host. In step 1004, the base station searches the local subscriber list 150 (FIG. 4A) using the received link layer ID value as a search key to the local subscriber list, comparing the received link layer ID value to the link layer ID portions of the values stored in the subscriber key field 154 (FIG. 4A) of each of the cache entries 152 (FIG. 4A).

From step 1004, the process proceeds to 1006 at which the base station determines whether the profile associated with the new host is found in the local subscriber list 150 (FIG. 4A), and if so, the process proceeds to step 1008 in which the base station reads the profile associated with the new host from the local cache database 132 (FIG. 3B) using a pointer address value read from field 156 of the local subscriber list 150 (FIG. 4A), and performs an authentication procedure using this profile to determine whether the new host is authentic. Assuming that the new host is authentic, the process proceeds from step 1008 to step 1010 in which the base station transmits copies of the profile associated with the new host to the mirror base stations associated with the base station. As mentioned above, the IP addresses of the associated mirror base stations are stored at the base station. In one embodiment of the present invention, copies of the profile associated with the new host are transmitted from the base station 114 (FIG. 3A) to each of the associated mirror base stations by generating and transmitting a cache entry copy message 830 (FIG. 9G) which carries the subscriber key value associated with the new host in the key field 842 (FIG. 9G), and the profile associated with the new host in the cache entry field 846 (FIG. 9G). Each of the associated mirror base stations receives a cache entry copy message 830 (FIG. 9G) including the profile associated with the new host, and adds this profile to its global/mirror profile subscriber list 160 (FIG. 4B).

From step 1010, the process proceeds to step 1012 in which the base station announces that the profile associated with the new host is owned by the local base station which is identified by its IP address. In one embodiment, step 1010 includes broadcasting a cache entry announcement message 700 (FIG. 9A) via the backbone 112 of the network 100 (FIG. 3A) which carries the subscriber key value associated with the new host in the key field 726 (FIG. 9A), and the IP address of the base station (which now owns the profile associated with the new host) in the node ID field 722 (FIG. 9A). Each of the base stations receives a cache entry announcement message including the subscriber key value associated with the new host, and the IP address of the base station which now owns the profile associated with the new host, and uses this information to update its global/mirror profile subscriber list 160 (FIG. 4B). Note that step 1012 may be redundant because the global subscriber lists may have already indicated that the profile associated with the new host was stored in the subject base station.

Alternatively, if it is determined at 1006 that the profile associated with the new host is not found in the local subscriber list 150 (FIG. 4A), the process proceeds to step 1014 in which the base station searches the mirror profile list of the local base station using the received link layer identifier as a search key. In the preferred embodiment, step 1014 includes searching the global/mirror profile subscriber list 160 (FIG. 4B). From step 1014, the process proceeds to 1016 in which the base station determines whether the profile associated with the new host is found in the mirror profile list, and if so, the process proceeds to step 1018 in which the base station reads the profile associated with the new host from local cache database 132 (FIG. 3B) using the pointer address value read from field 168 of the global/mirror profile subscriber list 160 (FIG. 4B), and performs an authentication procedure. As mentioned above, a very important advantage of the location update protocol of the present invention is realized by copying profile from base stations to their associated mirror sites. If a profile associated with a new host is found in the mirror profile list, there is no need to retrieve the profile from another base station or from the central server site.

Assuming that the authentication procedure has been satisfied, the process proceeds from step 1018 to step 1020 in which the base station updates the local profile subscriber list 150 (FIG. 4A) by adding the profile associated with the new host to the local subscriber list. From step 1020, the process proceeds to step 1022 in which the base station copies the new profile associated with the new mobile host to the mirror sites associated with the base station in the same manner as described in step 1010 above. Each of the associated mirror base stations receives a cache entry copy message 830 (FIG. 9G) including the profile associated with the new host, and adds this profile to its global/mirror profile subscriber list 160 (FIG. 4B). From step 1022, the process proceeds to step 1024 in which the base station announces that the profile associated with the new host is owned by the local base station in the same manner as described in step 1012 described above. Alternatively, if it is determined at 1016 that the new host is not found in the mirror profile list, the process proceeds to "A" (to FIG. 7).

Figure 10B:
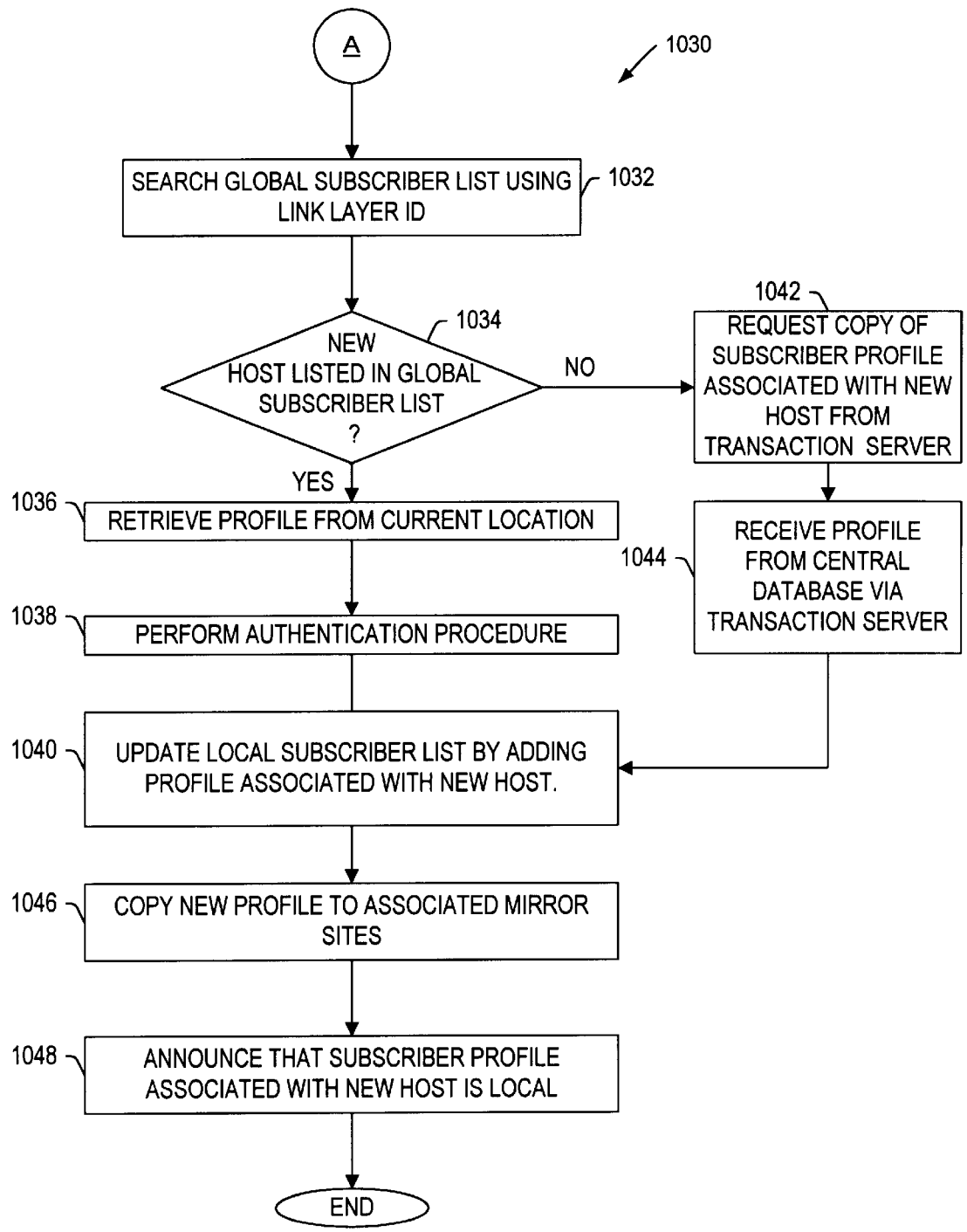

FIG. 10B shows a flow diagram illustrating further steps at 1030 of the location update sub-process 1000 (FIG. 10A), the depicted steps proceeding from "A" (from FIG. 10A) to step 1032 in which the base station searches the global profile list using the received link layer identifier which was received in step 1002 (FIG. 6). In the preferred embodiment, step 1032 includes searching the global/mirror profile subscriber list 160 (FIG. 4B) using the received link layer ID as a search key, comparing the received link layer ID to the link layer ID portions of the subscriber key field 164 (FIG. 4B).

From step 1032 the process proceeds to 1034 at which the base station determines whether the new host is found in the global profile list, and if so, the process proceeds to step 1036 in which the base station retrieves the profile associated with the new host from its current location which is the base station that currently owns the profile associated with the new host. The owner of the profile associated with the new host is indicated by an IP address stored in the base station location field 166 (FIG. 4B) of the cache entry in the global/mirror profile subscriber list which matches the received link layer ID. Step 1032 includes: reading the IP address stored in the base station location field 166 (FIG. 4B) of the cache entry associated with the new host; sending a cache entry transfer request message 770 (FIG. 9D) to the base station that currently owns the profile, the transfer request message carrying the subscriber key value associated with the new host in its key field 782 (FIG. 9D), and carrying the IP address of the local base station in its node ID field 778 (FIG. 9D); and receiving a cache entry transfer message 790 (FIG. 9E) from the base station that currently owns the profile, the cache entry transfer message carrying the profile associated with the new host in its cache entry field 806 (FIG. 9E).

From step 1036, the process proceeds to step 1038 in which the base station performs an authentication procedure on the new host. Assuming that the authentication procedure has been satisfied, the process proceeds from step 1038 to step 1040 in which the base station updates the local subscriber list 1100 (FIG. 4A) by adding the subscriber profile associated with the new host to the local list.

Alternatively, if it is determined at 1034 that the new host is not found in the global profile list, the process proceeds from 1034 to step 1042 in which the base station requests a copy of the subscriber profile associated with the new host from the central data base 108 (FIG. 3A) of the central database system by querying a transaction server 110 (FIG. 3A). From step 1042, the process proceeds to step 1044 in which the base station receives the profile from the central database 108 (FIG. 3A) via the associated transaction server. From step 1044, the process proceeds to step 1040 described above.

From step 1040, the process proceeds to step 1046 in which the base station copies the new profile associated with the new host to each of the mirror sites associated with the base station in the same manner as described above in reference to steps 1010 and 1022 (FIG. 6). Each of the associated mirror base stations receives a cache entry copy message 830 (FIG. 9G) including the profile associated with the new host, and adds this profile to its global/mirror profile subscriber list 160 (FIG. 4B). From step 1046, the process proceeds to step 1048 in which the base station announces that the profile associated with the new host is owned by the local base station in the same manner as described above in reference to steps 1012 and 1024 (FIG. 10A).

Figure 10C:
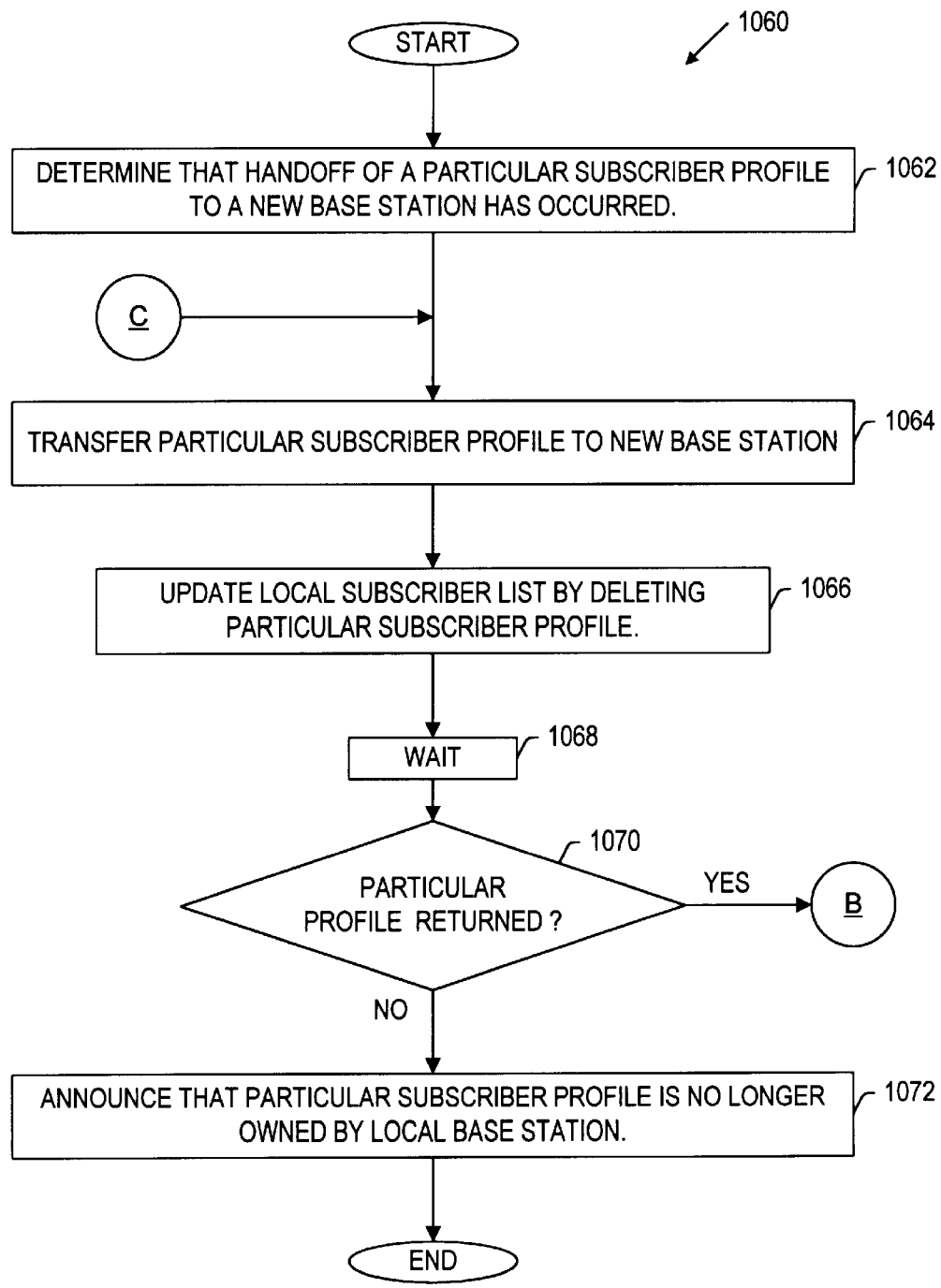

FIG. 10C shows a flow diagram illustrating a location update sub-process at 1060, the sub-process 1060 being performed by one of the base stations 114 (FIG. 3A) in the event of a hand off of control of communication with a subscriber from the local base station to a new base station. As mentioned above, when one of the mobile hosts 120 (FIG. 3A) crosses the coverage area boundary between a pair of coverage areas 118 (FIG. 3A) associated with base stations 114, a hand-off procedure is performed by the old base station (covering the area from which the mobile host has departed) and the new base station (covering the area into which the host has entered). As mentioned above, in different types of hand-off procedures, either the receiving side (the new base station) or the hand-off side (the old base station) may initiate the hand-off procedure which includes transferring the subscriber profile associated with the host from the old base station to the new base station. Depending upon which type of hand-off procedure initiation scheme is used, a different procedure may be used. The DCS protocol and the location update protocol of the present invention provide flexibility in allowing for use of either type of hand-off procedure.

In one embodiment, the sub-process at 1060 is implemented as software instructions executed by the base station computer system 130 (FIG. 3B). The process 1060 begins with step 1062 in which the base station determines that a handoff of a particular subscriber profile to a new base station has occurred.

From step 1062, the process proceeds to step 1064 in which the base station transfers the particular subscriber profile to a new base station. In transferring the particular subscriber profile, the local base station relinquishes ownership of the particular subscriber profile to the new base station. In one embodiment, step 1062 includes generating and transmitting a cache entry transfer message 790 (FIG. 9E) to the new base station, the cache entry transfer message carrying the particular subscriber profile in its cache entry field 806 (FIG. 9E) and the associated subscriber key value in its key field 802 (FIG. 9E). On the receiving end, the new base station receives the cache entry transfer message including the particular subscriber profile, and adds this profile to its local subscriber list 150 (FIG. 4A).

From step 1064, the process proceeds to step 1066 in which the base station updates the local subscriber list 150 (FIG. 4A) by deleting the particular subscriber profile entry, as the local base station has relinquished ownership of the particular subscriber profile to the new base station.

From step 1066, the process proceeds to step 1068 in which the base station waits for a predetermined period of time, after which the base station determines at 1070 whether the particular subscriber profile has been returned to the local base station (as a result of a hand-off of the profile back from the new base station back to the local base station), and if not, the local base station then announces to the network in step 1072 that the particular subscriber profile is no longer owned by the local base station. In one embodiment, step 1072 includes generating and broadcasting a cache entry withdrawal message 730 (FIG. 9B) via the backbone 112 of the network 100 (FIG. 3A), the cache entry withdrawal message including the IP address of the base station in its node ID field 742, and carrying the subscriber key value associated with the particular subscriber profile in its key field 746 (FIG. 9B).

By waiting a predetermined period of time and verifying that the particular subscriber profile is not still owned by the local base station, the location update process of the present invention avoids the problem of causing congestion on the network due to broadcasting of multiple cache entry announcement messages 700 (FIG. 9A), cache entry withdrawal messages 230 (FIG. 5B), and cache entry transfer messages 790 (FIG. 9E) which would result from the initiation of multiple hand-off procedures caused by a subscriber travelling back and forth across a boundary between two areas covered by different base station if there was no waiting period. In order to ensure that call processing functions are operable during the waiting period, each base station is operative to forward call processing information to the base station which currently owns the subject subscriber profile in the event that the update has not yet been announced to other base stations in the network including a base station associated with a calling party trying to reach the particular subscriber.

Figure 10D:
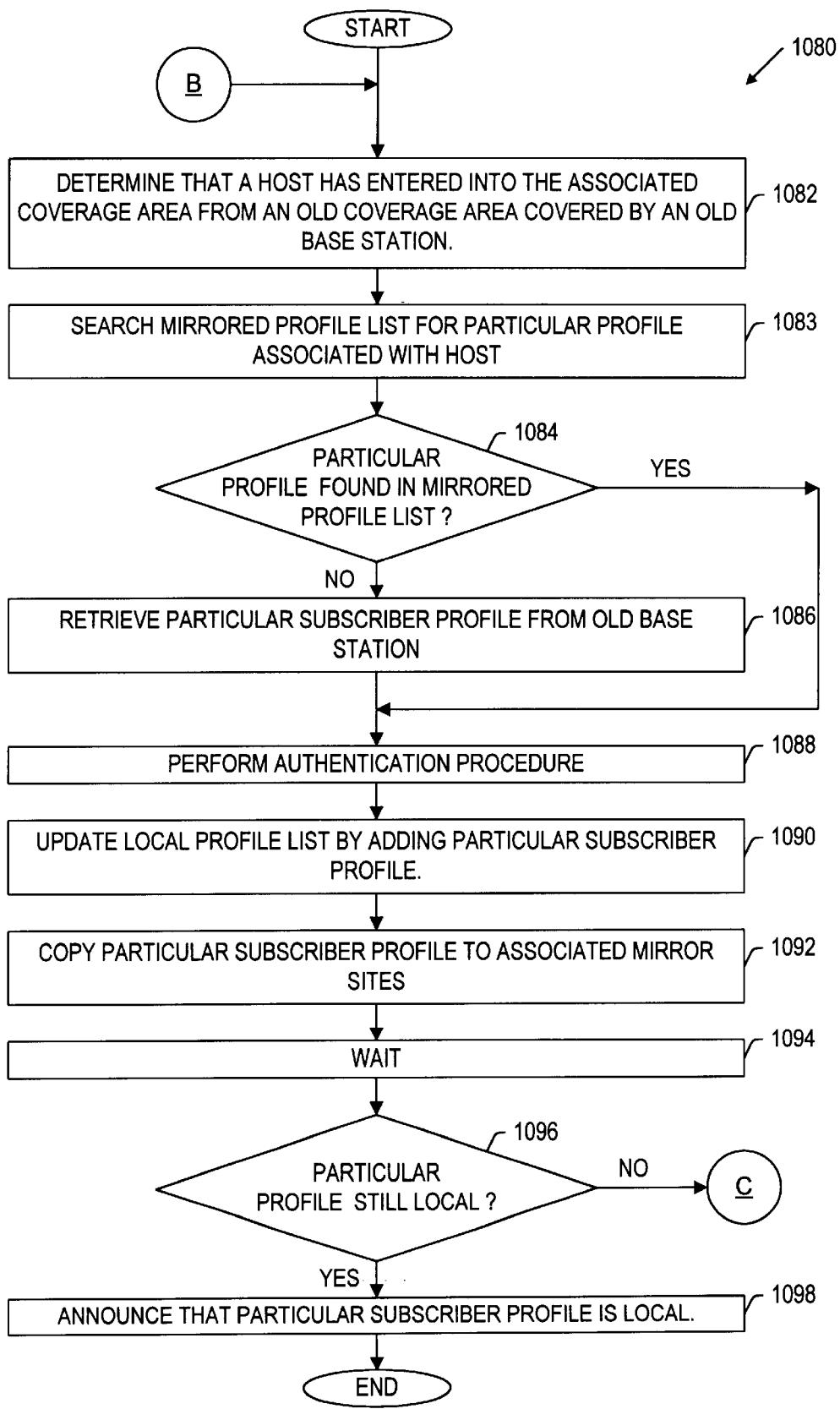

FIG. 10D shows a flow diagram illustrating a location update sub-process at 1080, the sub-process 1080 being performed by a new one of the base stations 114 (FIG. 3A) in the event of a hand off of control of communication with a subscriber from an old base station to the new base station. In one embodiment, the sub-process at 1080 is implemented as software instructions executed by the base station computer system 130 (FIG. 3B). The process 1080 begins at step 1082 in which the base station determines that a handoff of a particular subscriber profile to the local base station has occurred.

From step 1082, the process proceeds to step 1083 in which the base station searches the mirror profile list of the local base station. In the preferred embodiment, step 1083 includes searching the global/mirror profile subscriber list 160 (FIG. 4B). From step 1083, the process proceeds to 1084 at which the base station determines whether the particular subscriber profile found is in the mirror profile list. If the particular profile is listed in the mirror profile list, then the base station reads the particular profile from the local cache database 132 (FIG. 3B), and there is no need to retrieve the particular subscriber profile from another base station or from the central server site. If the particular subscriber profile listed is in the mirror profile list, the process proceeds to step 1088 in which the base station performs an authentication procedure.

Alternatively if it is determined at 1084 that the particular profile is not found in the mirror profile list, the process proceeds from 1084 to step 1086 in which the base station retrieves the particular subscriber profile from the old base station in the same manner as described above with reference to step 1036 (FIG. 7). Assuming that the authentication procedure has been satisfied, the process proceeds from step 1088 to step 1090 in which the base station updates the local profile list by adding the particular subscriber profile to the local subscriber list 150 (FIG. 4A).

From step 1090, the process proceeds to step 1092 in which the base station copies the new profile associated with the new mobile host to each of the mirror sites associated with the base station using the cache entry copy message 830 (FIG. 9G) in the same manner as described with reference to steps 1010 (FIG. 10A). Each of the associated mirror base stations receives a cache entry copy message 830 (FIG. 9G) including the particular subscriber profile, and adds this profile to its mirror profile subscriber list 160 (FIG. 4B).

From step 1092, the process proceeds to step 1094 in which the base station waits for a predetermined period of time, after which the base station determines at 1096 whether the particular subscriber profile is still owned by the local base station, and if so, the base station then announces to the network that the particular subscriber profile is owned by the local base station using the cache entry announcement message 700 (FIG. 9A) in the same manner as described above with reference to step 1024 (FIG. 6). By waiting a predetermined period of time and verifying that the particular subscriber profile is still owned by the local base station, the location update process of the present invention avoids the problem of causing congestion on the network due to broadcasting of multiple cache entry announcement messages 700 (FIG. 9A), cache entry withdrawal messages 730 (FIG. 9B), and cache entry transfer messages 790 (FIG. 9E) which would result from the initiation of multiple hand-off procedures caused by a subscriber travelling back and forth across a boundary between two areas covered by different base station if there was no waiting period. In order to ensure that call-processing functions are operable during the waiting period, each base station is operative to forward call-processing information to the base station Alternatively, if it is determined at 1096 that the particular subscriber profile is not still owned by the local base station, as a result of a hand-off of the particular profile back to the old base station, then process proceeds to "C" (back to FIG. 8).

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A mobile communications network providing a distributed cache for managing subscriber profile information associated with each of a plurality of subscribers of the network, comprising:

a plurality of base stations communicatively coupled with each other via a backbone of the network, each of said base stations having an associated coverage area, and being operative to communicate via wireless communication links with subscribers using mobile hosts located within said associated coverage area, each of said base stations including a memory unit having a local database for storing, each of said base stations is operative to transfer and copy profiles to other ones of said base stations in accordance with a distributed cache synchronization protocol established by neighbor proximity, a local subscriber list including a plurality of locally owned cache entries each having an associated subscriber key value, and an associated locally owned subscriber profile, and a global subscriber list including a plurality of global cache entries each having an associated subscriber key value, and an associated location value indicating a node in the network at which an associated subscriber profile is stored; wherein each of said base stations is operative to transfer and copy selected ones of said cache entries to other ones of said base stations via said backbone for the purposes of managing and accessing said distributed cache, and for supporting communications applications in the network.

2. A mobile communications network as recited in claim 1 wherein each of said base stations is operative in accordance with said protocol to transfer a particular one of said cache entries to a new owner one of said base stations via said backbone upon a determination that ownership of said particular cache entry has been transferred to said new owner base station.

3. A mobile communications network as recited in claim 1 wherein each of said base stations is operative in accordance with said protocol to transfer a particular one of said cache entries to a new owner one of said base stations via said backbone upon execution of an associated handoff procedure.

4. A mobile communications network as recited in claim 1 wherein each of said base stations is operative in accordance with said protocol to copy a particular one of said cache entries to a requesting one of said base stations via said backbone in response to receiving a cache entry copy request message from said requesting base station.

5. A mobile communications network as recited in claim 1 wherein each of said base stations is operative in accordance with said protocol to send cache entry copy request messages requesting associated cache entries in order to support call processing operations.

6. A mobile communications network as recited in claim 1 wherein:

each of said base stations is operative to access an associated mirror base station list indicating at least one associated mirror one of said base stations;

said local database of each of said base stations further provides for storage of a mirror subscriber profile list including a plurality of mirror cache entries each having an associated subscriber key value, and an associated mirror subscriber profile; and each of said base stations is operative to periodically transfer mirror copies of each of said associated locally owned cache entries to each of said associated mirror base stations via said back bone in accordance with said protocol.

7. A mobile communications network as recited in claim 1 wherein:

each of said base stations is operative to access an associated mirror base station list indicating at least one associated mirror one of said base stations;

said local database of each of said base stations further provides for storage of a mirror subscriber profile list including a plurality of mirror cache entries each having an associated subscriber key value, and an associated mirror subscriber profile;

each of said base stations is operative to periodically transfer mirror copies of each of said associated locally owned cache entries to each of said associated mirror base stations via said back bone in accordance with said protocol; and each of said mirror base stations is responsive to the received mirror copies of cache entries, and operative to store said mirror copies in said local database, and also operative to revise said mirror subscriber profile list to include said received mirror copies;

whereby if ownership of a particular one of said subscriber profiles associated with a particular one of said hosts is transferred from an old one of said base stations to a new mirror base station associated with said old base station as a result of a hand off procedure executed while said particular host is engaged in a communication session controlled by said old base station, then transfer of control of said communication session to said new mirror base station is facilitated by said new mirror base station already having a copy of said particular subscriber profile.

8. A mobile communications network as recited in claim 1 wherein said network further comprises:

a central database system including a central server, and a central database for storing subscriber profile information associated with each of said subscribers, and wherein said central database also stores the mirror base station lists associated with each one of said base stations; and wherein each of said base stations is operative to access said associated mirror base station list by querying said central server.

9. A mobile communications network as recited in claim 1 wherein each of said subscriber profile key values includes a link layer identification value associated with one of said mobile hosts, and wherein each of said local subscriber list, said global subscriber list, and said mirror subscriber list may be searched by said base station using the link layer identification values.

10. A mobile communications network as recited in claim 9 wherein each of said subscriber profile key values further includes a telephone number associated with said associated subscriber, and wherein each of said local subscriber list, said global subscriber list, and said mirror subscriber list may be searched by said associated base station using the telephone numbers.

11. A mobile communications network as recited in claim 1 wherein said network further comprises:

a central database system including a central server, and a central database for storing subscriber profiles associated with each of said subscribers; and wherein updates to subscriber profiles associated with subscribers of the network may be initiated at either of said central database system, or one of said mobile hosts.

12. A mobile communications network as recited in claim 11 wherein each of said subscriber profiles includes a version value for tracking said updates to said profiles.

13. A mobile communications network as recited in claim 11 wherein each of said subscriber profiles includes a version value for tracking said updates to said profiles as said updates are initiated at either of said central database system, or one of said mobile hosts.

14. A mobile communications network as recited in claim 13 wherein said version value of each of said subscriber profiles comprises:
 a major version number which is increased upon commitment of an update of an associated profile to said central database; and
 a minor version number which is increased upon commitment of an update of said associated profile to said local database.

15. A mobile communications network as recited in claim 14 wherein each of said base stations is operative to determine and resolve conflicts related to the contents of updated profiles, said conflicts arising as a result of a first update being initiated by said central database system, and a second update being initiated by one of said mobile hosts.

16. A mobile communications network as recited in claim 14 wherein each of said base stations is operative to determine and resolve said conflicts by comparing the version values of multiple conflicting copies of an associated profile for which a conflict has arisen.

17. In a base station of a mobile communications network having a plurality of base stations communicatively coupled with each other via a backbone of the network, each of said base stations having an associated coverage area, and being operative to communicate via wireless communication links with subscribers using mobile hosts located within said associated coverage area, each of said base stations including a memory unit having a local database, a method of providing a distributed cache for managing subscriber profile information associated with each
 of the subscribers of the network, comprising the steps of:
 storing in said local database,
 a local subscriber list including a plurality of locally owned cache entries each having an associated subscriber key value, and an associated locally owned subscriber profile, and
 a global subscriber list including a plurality of global cache entries each having an associated subscriber key value, and an associated location value indicating a node in the network at which an associated subscriber profile is stored;
 determining whether ownership of a particular one of said locally stored subscriber profiles has been transferred to a new owner one of said base stations; and if said ownership of said particular subscriber profile has been transferred to a new owner one of said base stations, transferring said particular cache entry to said new owner base station via said backbone in accordance with a distributed cache synchronization protocol established by neighbor proximity.

18. In a base station of a mobile communications network as recited in claim 17 further comprising the steps of:
 accessing an associated mirror base station list identifying at least one associated mirror one of said base stations;
 storing and managing a mirror subscriber profile list in said local database, said mirror subscriber profile list including a plurality of mirror cache entries each having an associated mirror subscriber profile, and an associated subscriber key value; and
 transferring mirror copies of each of said locally owned cache entries to each of said associated mirror base stations via said back bone in accordance with said protocol.

19. In a base station of a mobile communications network as recited in claim 18 wherein said network also comprises a central database system including a central server, and a central database for storing subscriber profile information associated with each of said subscribers, and wherein said central database also stores the mirror base station lists associated with each one of said base stations, further comprising the step of accessing said associated mirror base station list by querying said central server.

20. In a base station of a mobile communications network as recited in claim 18 wherein each of said subscriber profile key values includes a link layer identification value associated with one of said mobile hosts, said method further comprising the step of:
 searching each of said local subscriber list, said global subscriber list, and said mirror subscriber list using a link layer identification value.

21. In a base station of a mobile communications network as recited in claim 20 wherein each of said subscriber profile key values includes a telephone number associated with one of said subscribers, said method further comprising the step of:
 searching each of said local subscriber list, said global subscriber list, and said mirror subscriber list using a telephone number.

22. In a base station of a mobile communications network as recited in claim 20 further comprising the steps of:
 receiving a registration message from a registering one of said hosts, said received registration message including a received link layer ID value;
 searching said local subscriber list using said received link layer ID value to determine if a profile associated with said registering host is indicated in said local subscriber list; and
 if said profile associated with said registering host is indicated in said local subscriber list, accessing said locally stored profile associated with said registering host.

23. In a base station of a mobile communications network as recited in claim 22 wherein if said profile associated with said registering host is not indicated in said local subscriber list, said process further comprises the steps of:
 searching said mirror subscriber list using said received link layer ill value to determine if said profile associated with said registering host is indicated in said mirror subscriber list; and
 if said profile associated with said registering host is indicated in said mirror subscriber list,
 updating said local subscriber list by adding a cache entry including said profile associated with said registering host to said local subscriber list,
 sending a cache entry transfer request to the current owner of the profile; and announcing to other ones of said base stations that said profile associated with
 said registering host is owned by said base station in accordance with said protocol.

24. In a base station of a mobile communications network as recited in claim 23 wherein if said profile associated with said registering host is not indicated in said local subscriber list, said process further comprises the steps of:
if said profile associated with said registering host is not indicated in either of said local subscriber list or said mirror subscriber list,
searching said global subscriber list using said received link layer ill value to determine if said profile associated with said registering host is indicated in said global subscriber list, and
if said profile associated with said registering host is indicated in said global
subscriber list,
reading the location value associated with said profile to determine the node in the network at which said profile is stored, and
retrieving said profile associated with said registering host from said node at which said profile is stored.

25. In a base station of a mobile communications network as recited in claims 23 wherein said step of retrieving said profile associated with said registering host comprises:
sending a cache entry transfer request message to said node at which said profile is stored in accordance with said protocol, said cache entry transfer request message indicating said
profile associated with said registering host; and
receiving a cache entry transfer message from said node in accordance with said protocol, said cache entry transfer message carrying said profile associated with said registering host.

26. In a base station of a mobile communications network as recited in claims 23 wherein if said profile associated with said registering host is not indicated in either of said local subscriber list or said mirror subscriber list, and said profile associated with said registering host is
indicated in said global subscriber list, said method further comprises the steps of:
updating said local subscriber list by adding a cache entry including said profile associated with said registering host to said local subscriber list;
copying said profile associated with said registering host to said associated mirror sites in accordance with said protocol; and
announcing in accordance with said protocol to other ones of said base stations that said profile associated with said registering host is owned by said base station.

27. In a base station of a mobile communications network as recited in claim 20 further comprising the step of:
if said link layer identification value is not found in said local subscriber list, said global subscriber list, and said mirror subscriber list,
sending a message to retrieve said profile from the central database system, copying said profile associated with said registering host to said associated mirror
sites in accordance with said protocol, and
announcing to other ones of said base stations that said profile associated with said registering host is owned by said base station in accordance with said protocol.

28. In a base station of a mobile communications network as recited in claim 27 wherein said step of announcing to other ones of said base stations that said profile associated with said registering host is owned by said base station comprises transmitting a cache entry announcement message via said network in accordance with said protocol.

29. In a base station of a mobile communications network as recited in claim 17 further comprising the steps of:
accessing an associated mirror base station list identifying at least one associated mirror one of said base stations;
storing and managing a mirror subscriber profile list in said local database, said mirror subscriber profile list including a plurality of mirror cache entries each having an associated mirror subscriber profile, and an associated subscriber key value;
transferring mirror copies of each of said locally owned cache entries to each of said associated mirror base stations via said back bone in accordance with said protocol; and
receiving mirror copies of cache entries, and storing said mirror copies in said local database, and also revising said mirror subscriber profile list to include mirror cache entries associated with said received mirror copies;
whereby if ownership of a particular one of said subscriber profiles associated with a particular one of said hosts is transferred from an old one of said base stations to a new mirror base station associated with said old base station as a result of a hand off procedure executed while said particular host is engaged in a communication session controlled by said old base station, then transfer of control of said communication session to said new mirror base station is facilitated by said new mirror base station already having a copy of said particular subscriber profile.

30. In a base station of a mobile communications network as recited in claim 17 wherein each of said subscriber profiles includes a version value for tracking updates to the profiles, said version value including a major version number which is increased upon commitment of an update of an associated profile to said central database, and a minor version number, further comprising the step of:
increasing the minor version number upon commitment of an update of the associated profile to said local database.

31. In a base station of a mobile communications network as recited in claim 17 wherein said network further comprises a central database system including a central server, and a central database for storing subscriber profiles associated with each of said subscribers, and wherein conflicts may arise between updates of profiles initiated by a host and by the central database system, said method further comprising the steps of:
receiving a command for updating a particular subscriber profile from one of said mobile hosts via a wireless link;
updating contents of said particular subscriber profile to create a first updated version of said particular subscriber profile, and storing said first updated particular subscriber profile in the local database;
receiving an updated profile message from the central database system, said updated profile message including a second updated version of said particular subscriber profile;
comparing the contents of said first updated version of said particular subscriber profile to contents of said second updated version;

determining is there is a conflict between the contents of said first updated version and the contents of said second updated version; and if there is a conflict between the contents of said first updated version and the contents of said second updated version, resolving the conflict.

32. In a base station of a mobile communications network as recited in claim 17 further comprising the steps of:

determining that a particular one of said locally owned subscriber profiles has been handed off to a new one of said base stations; and transferring said particular subscriber profile to said new base station via a cache entry transfer message in accordance with said protocol.

33. In a base station of a mobile communications network as recited in claim 32 further comprising the step of:

announcing to other ones of said base stations via a cache entry withdrawal message that said particular profile is no longer owned by said base station.

* * * * *